US012631024B2

(12) United States Patent
Collins et al.

(10) Patent No.: US 12,631,024 B2
(45) Date of Patent: May 19, 2026

(54) MULTI-STORY BUILDING HAVING LOAD BEARING WALLS AND METHOD TO CONSTRUCT THE BUILDING

(71) Applicant: Innovative Building Technologies, LLC, Seattle, WA (US)

(72) Inventors: Arlan E. Collins, Seattle, WA (US); Mark L. Woerman, Seattle, WA (US); Mark D'Amato, Seattle, WA (US); Eric P. Hinckley, Superior, CO (US); Calder Danz, Seattle, WA (US); Christopher J. Allen, Aloha, OR (US); Dale V. Paul, Poulsbo, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 245 days.

(21) Appl. No.: 18/248,783

(22) PCT Filed: Oct. 21, 2021

(86) PCT No.: PCT/US2021/056091
§ 371 (c)(1),
(2) Date: Apr. 12, 2023

(87) PCT Pub. No.: WO2022/087296
PCT Pub. Date: Apr. 28, 2022

(65) Prior Publication Data

US 2024/0026676 A1 Jan. 25, 2024

Related U.S. Application Data

(60) Provisional application No. 63/178,515, filed on Apr. 22, 2021, provisional application No. 63/104,239, filed on Oct. 22, 2020.

(51) Int. Cl.
*E04B 1/08* (2006.01)
*B66B 11/00* (2006.01)
(Continued)

(52) U.S. Cl.
CPC ............ *E04B 5/04* (2013.01); *B66B 11/0005* (2013.01); *B66B 19/00* (2013.01); *E04B 1/02* (2013.01);
(Continued)

(58) Field of Classification Search
CPC .......... E04B 1/167; E04B 1/08; E04B 1/2403; E04B 1/3483; E04B 1/18; E04B 1/02;
(Continued)

(56) References Cited

U.S. PATENT DOCUMENTS 3,750,366 A 8/1973 Rich, Jr. et al.
5,644,871 A * 7/1997 Cohen ....................... E04B 5/04 52/125.4

(Continued)

OTHER PUBLICATIONS

USPTO, Written Opinion for International Patent Application No. PCT/US2021/056091, Jan. 21, 2022, 4 pages.

(Continued)

*Primary Examiner* — Paola Agudelo
(74) *Attorney, Agent, or Firm* — IP Spring

(57) ABSTRACT

A building includes load bearing walls that are able to withstand vertical loads and lateral loads. The building may be a low-rise building or a mid-rise building. The load bearing walls, as well as floor-ceiling panels, corridor panels, utility walls, and other parts of the building are pre-manufactured off-site and then installed on-site at the site of the building. The floor-ceiling panels are hung from the load bearing walls, utility walls are hung from the load bearing walls, and corridor panels are hung from the utility walls.

20 Claims, 17 Drawing Sheets

(51) Int. Cl.

| | |
|---|---|
| ***B66B 19/00*** | (2006.01) |
| ***E04B 1/02*** | (2006.01) |
| ***E04B 1/24*** | (2006.01) |
| ***E04B 1/348*** | (2006.01) |
| ***E04B 1/61*** | (2006.01) |
| ***E04B 2/60*** | (2006.01) |
| ***E04B 5/04*** | (2006.01) |
| ***E04B 5/10*** | (2006.01) |
| ***E04B 9/00*** | (2006.01) |
| ***E04B 9/04*** | (2006.01) |
| *E04B 5/02* | (2006.01) |

(52) U.S. Cl.
CPC .................. *E04B 1/08* (2013.01); *E04B 1/24* (2013.01); *E04B 1/2403* (2013.01); *E04B 1/3483* (2013.01); *E04B 1/34869* (2013.01); *E04B 1/612* (2013.01); *E04B 1/6125* (2013.01); *E04B 2/60* (2013.01); *E04B 5/10* (2013.01); *E04B 9/008* (2013.01); *E04B 9/04* (2013.01); *E04B 2001/2415* (2013.01); *E04B 2001/2418* (2013.01); *E04B 2001/2451* (2013.01); *E04B 2001/2481* (2013.01); *E04B 2001/6191* (2013.01); *E04B 2001/6195* (2013.01); *E04B 5/02* (2013.01); *E04B 2103/06* (2013.01)

(58) Field of Classification Search
CPC ............... E04B 1/34869; E04B 1/6125; E04B 1/34321; E04B 5/02; E04B 9/04; E04B 9/10; E04B 9/22
USPC .............................................................. 52/30
See application file for complete search history.

(56) References Cited

U.S. PATENT DOCUMENTS

| | | | | |
|---|---|---|---|---|
| 6,073,401 | A * | 6/2000 | Iri | E04B 1/3483 52/79.9 |
| 8,234,827 | B1 * | 8/2012 | Schroeder, Sr | E04B 1/24 52/638 |
| 8,276,328 | B2 * | 10/2012 | Pepin | E04C 2/386 52/657 |
| 2004/0261349 | A1 * | 12/2004 | Hashimoto | E04B 1/08 52/633 |
| 2010/0229472 | A1 * | 9/2010 | Malpas | E04C 2/521 52/173.3 |
| 2013/0211795 | A1 * | 8/2013 | Vanker | E04B 1/08 703/1 |
| 2014/0033631 | A1 * | 2/2014 | Rokk | E04H 9/00 52/582.2 |
| 2014/0083046 | A1 * | 3/2014 | Yang | E04B 1/2403 52/704 |
| 2015/0308096 | A1 * | 10/2015 | Merhi | E04G 21/14 52/745.1 |
| 2016/0040443 | A1 * | 2/2016 | Stephenson | E04H 1/005 52/79.5 |
| 2017/0284095 | A1 * | 10/2017 | Collins | E04C 2/322 |
| 2018/0355601 | A1 * | 12/2018 | Collins | E04B 1/24 |
| 2019/0010693 | A1 * | 1/2019 | Powers | E04H 15/001 |
| 2019/0169844 | A1 * | 6/2019 | Yousefi Darestani | E04B 1/167 |
| 2019/0323235 | A1 * | 10/2019 | Benson | E04C 3/34 |
| 2020/0040594 | A1 | 2/2020 | Hedberg | |
| 2020/0123761 | A1 | 4/2020 | Garcia-Abril Ruiz et al. | |
| 2023/0061113 | A1 * | 3/2023 | Keller | E04B 2/56 |

OTHER PUBLICATIONS

USPTO, International Search Report for International Patent Application No. PCT/US2021/056091, Jan. 21, 2022, 2 pages.

* cited by examiner

MULTI-STORY BUILDING HAVING LOAD BEARING WALLS AND METHOD TO CONSTRUCT THE BUILDING

CROSS-REFERENCE TO RELATED APPLICATIONS

The present application is the U.S. national phase filing under 35 U.S.C. § 371 of International Patent Application No. PCT/US2021/056091, filed on Oct. 21, 2021, which claims priority under 35 U.S.C. § 119(e) and/or under PCT Article 8 to U.S. Provisional Patent Application No. 63/104,239, filed on Oct. 22, 2020, and entitled "LOAD BEARING WALLS FOR A BUILDING" and to U.S. Provisional Patent Application No. 63/178,515, filed on Apr. 22, 2021, and entitled "LOW-MID RISE BUILDING HAVING LOAD BEARING WALLS, UTILITY WALLS, AND A CORRIDOR SYSTEM, AND OTHER ACCOMPANYING STRUCTURE, AND METHOD TO CONSTRUCT THE BUILDING." The contents of U.S. Provisional Patent Application Nos. 63/104,239 and 63/178,515 are incorporated herein by reference in their entirety.

The present application is related in subject matter to each of the following applications, each of which shares a common international filing date of Oct. 21, 2021 as the present application, entitled "PRE-MANUFACTURED LOAD BEARING WALLS FOR A MULTI-STORY BUILDING" (International Patent Application No. PCT/US2021/056077), "MULTI-STORY BUILDING HAVING PODIUM LEVEL STEEL TRANSFER STRUCTURE" (International Patent Application No. PCT/US2021/056074), "PRE-MANUFACTURED FLOOR-CEILING PANEL FOR A MULTI-STORY BUILDING HAVING LOAD BEARING WALLS" (International Patent Application No. PCT/US2021/056076), "PRE-MANUFACTURED UTILITY WALL FOR A MULTI-STORY BUILDING HAVING LOAD BEARING WALLS" (International Patent Application No. PCT/US2021/056079), "PRE-MANUFACTURED FLOOR-CEILING CORRIDOR PANEL FOR A MULTI-STORY BUILDING HAVING LOAD BEARING WALLS" (International Patent Application No. PCT/US2021/056080), "MULTI-STORY BUILDING HAVING PRE-FABRICATED STAIR AND ELEVATOR MODULES" (International Patent Application No. PCT/US2021/056081), and "PRE-MANUFACTURED FLOOR-CEILING DRAG ANCHOR FOR A MULTI-STORY BUILDING HAVING LOAD BEARING WALLS" (International Patent Application No. PCT/US2021/056086), all of which are hereby incorporated by reference herein, in their respective entireties.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the pre-manufactured modules or components to a building construction site, and assembling the pre-manufactured modules or components at the building construction site.

While modular construction techniques provide certain advantages over traditional construction techniques, challenges continue to exist in being able meet housing and other building demands in communities. For example, the construction industry, whether using modular construction techniques or traditional construction techniques, needs to be able to address issues such as reducing construction costs and construction waste, reducing time to build, providing building designs that efficiently use space, and other challenges brought on by increasing demands for affordable housing and other building needs.

SUMMARY

An embodiment provides a method to construct a multi-story building. The method includes:

- installing a stair and elevator module at a ground level of the building;
- installing brace members that are guided into position by the stair and elevator module;
- constructing a steel transfer structure that is linked to the brace members, wherein the steel transfer structure includes vertical columns and horizontal beams;
- installing pre-manufactured first floor-ceiling panels by hanging the pre-manufactured first floor-ceiling panels from the beams;
- positioning pre-manufactured first load bearing walls on top of the beams;
- installing pre-manufactured utility walls by hanging the utility walls from the first load bearing walls; and
- installing corridor panels by hanging the corridor panels from the utility walls.

Another embodiment provides a multi-story building. The building includes:

- a stair and elevator module at a ground level of the building;
- brace members that are guided into position by the stair and elevator module;
- a steel transfer structure that is linked to the brace members, wherein the steel transfer structure includes vertical columns and horizontal beams;
- pre-manufactured first floor-ceiling panels that are hung from the beams;
- pre-manufactured first load bearing walls positioned on top of the beams;
- pre-manufactured utility walls that are hung from the first load bearing walls; and
- corridor panels that are hung from the utility walls.

DETAILED DESCRIPTION

Figure 1:
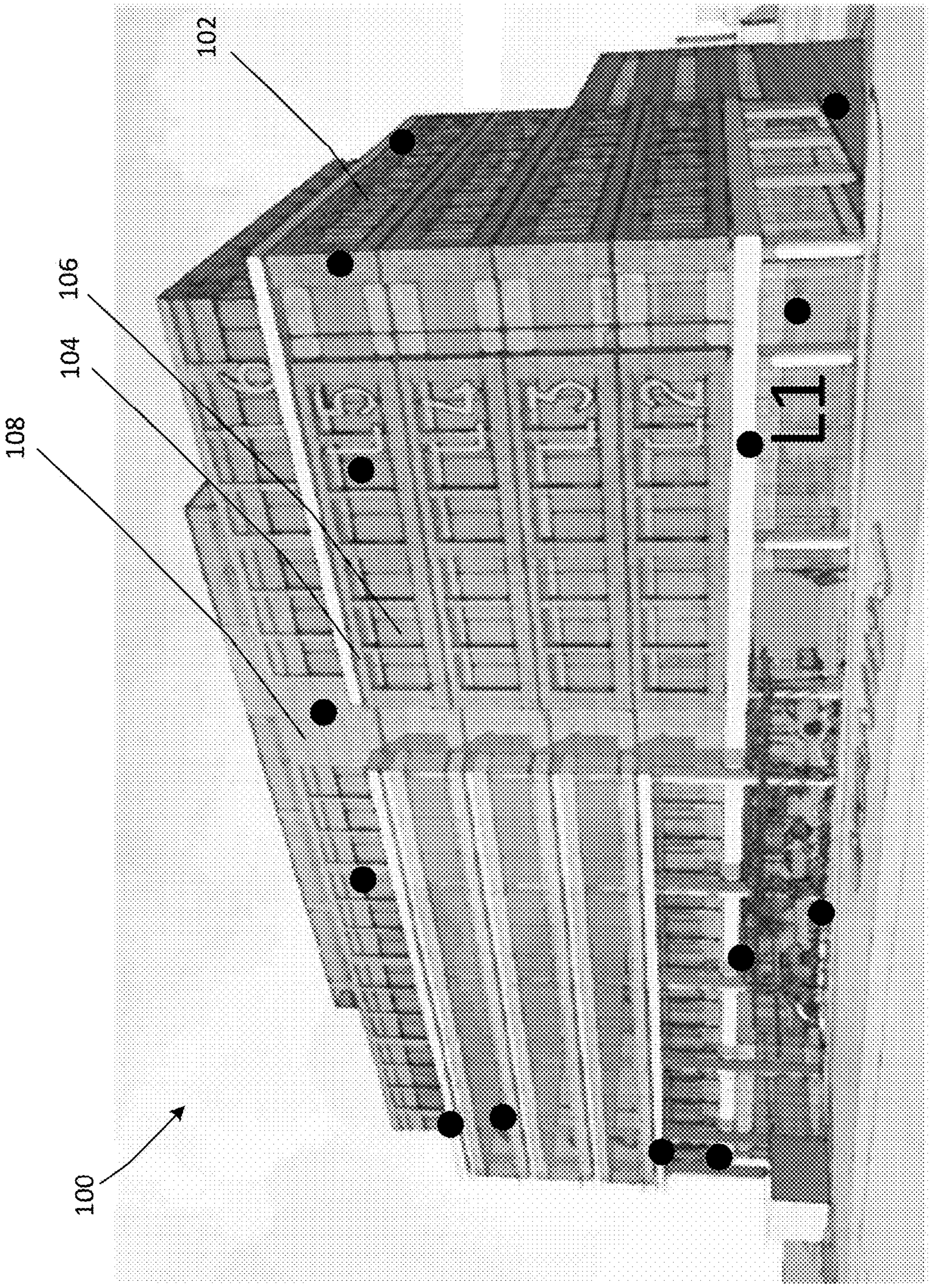
FIG. 1 is an illustration of an example multi-story building that can have load bearing walls and other building parts described herein, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

This disclosure is drawn, inter alia, to methods, systems, products, devices, and/or apparatuses generally related to load bearing walls and other building parts (e.g., floor panels, stair and elevator modules, steel transfer structures, corridor panels, etc.) for a multi-story building, such as a low-rise or mid-rise building. Traditionally, buildings are constructed using a steel structural frame that is designed to resist vertical and lateral loads. Thus, the structural frame can be thought of as a skeletal structure of a multi-story building, wherein the structural frame provides structural support for the building by absorbing vertical loads due to the weight of multiple stories and lateral loads such as due to wind or earthquakes, as well as providing the framing for various walls, floors, ceilings, and other components that can be affixed to the structural frame during the course of constructing the building. However, manufacturing and assembling such a traditional and extensive structural frame can be time consuming and costly in terms of labor and material. For instance, an affordable housing crisis or other community needs may dictate that buildings with good structural integrity be built quickly and economically.

Therefore, various embodiments disclosed herein provide a method to construct a building using load bearing walls and other building parts such that the reliance upon a traditional structural frame can be reduced or eliminated, while at the same time enabling the building to meet lateral and vertical loading requirements. The load bearing walls can be pre-manufactured demising walls, end walls, or other vertical walls (including possibly utility walls), at least some of which are constructed and arranged so as to provide the structural support for the building in a manner that is sufficient to enable the building to handle vertical and lateral loads. The other building parts, such as floor panels and corridor panels and their accompanying components, in combination with the load bearing walls and coupling linkages between them, also enhance the structural integrity for the building (e.g., for handling or transferring loads), improve acoustical performance, and increase fire safety.

The building may be a multi-story low-rise building or a multi-story mid-rise building in some embodiments. Each story of the building can include a single unit or multiple units. For instance, a particular unit may be living space, office space, retail space, storage space, or other human-occupied space or otherwise usable space in the building. In the context of living space, as an example, each story of the building may include multiple units to respectively accommodate multiple tenants.

The use of the pre-manufactured load bearing walls and other pre-manufactured parts enables the building to be constructed with a shorter time to build and at a lower cost (relative to a building that is constructed using a traditional structural frame), and without sacrificing the structural integrity of the building. Moreover, the floor-ceiling panels of the building may be made thinner relative to conventional floor-ceiling panels, thereby enabling the building to have more stories per vertical foot compared to a traditional building. Thus, the building is able to provide more usable space (e.g., living space) as opposed to a traditional building that occupies the same footprint. In other cases, the thinner floor-ceiling panels provide more space between the floor and ceiling of each unit, which may be desirable for some occupants that prefer living spaces with "high ceilings."

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, composites, to wood and wood polymer composites (WPC), wood based products (lignin), other organic building materials (bamboo) to organic polymers (plastics), to hybrid materials, earthen materials such as ceramics, or glass mat, gypsum, fiber cement, magnesium oxide, any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable (such as steel) for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is an illustration of an example multi-story building 100 that can have load bearing walls and other building parts (e.g., pre-manufactured floor-ceiling panels, corridor panels, utility walls, window walls, and other type of walls, etc.), in accordance with some implementations. It is noted that the building 100 of FIG. 1 is being shown and described herein as an example for purposes of providing context for the various embodiments in this disclosure. The various embodiments may be provided for buildings that have a different number of stories, footprint, size, shape, configuration, appearance, etc. than those shown for the building 100.

The building 100 may be a multi-story building with one or more units (e.g., living, office, or other spaces) in each story. In the example of FIG. 1, the building 100 has six stories/levels, labeled as levels L1-L6. Also as shown in FIG. 1, the building 100 has a generally rectangular footprint, although the various embodiments disclosed herein may be provided for buildings having footprints of some other shape/configuration. Moreover, each story may not necessarily have the same shape/configuration as the other stories. For instance in FIG. 1, level L6 of the building 100 has a smaller rectangular footprint relative to levels L1-L5.

The ground floor level L1 may contain living spaces, office spaces, retail spaces, storage spaces parking, storage, common areas (such as a lobby), etc. or combination thereof. Levels L2-L6 may also contain living spaces, office spaces, retail spaces, storage spaces common areas, etc. or combination thereof. Such spaces may be defined by discrete units, separated from each other and from corridors or common areas by interior demising walls and utility walls (not shown in FIG. 1). An individual unit in turn may be made up of multiple rooms that may be defined by load bearing or non-load bearing walls. For example, a single unit on any given level may be occupied by a tenant, and may include a kitchen, living room, bathrooms, bedrooms, etc. separated by walls, such as demising walls or utility walls. There may be multiple units (e.g., for multiple respective tenants) on each story, or only a single unit (e.g., for a single tenant) on a single story.

Each end of the building 100 includes an end wall 102. One or more panels that make up the end wall 102 may span a single story in height. Any of the sides of the building 100 may include an end wall or a window wall 104 that accommodates a window 106, such as window(s) for unit(s). One or more panels that make up the window wall 104 may span a single story in height. Some parts of the building 100 may include a wall without windows (e.g., not a window wall), such as an end wall 108, which may be comprised of a panel that spans one story of the building 100.

The unit(s) in each story may be formed using either an entire pre-manufactured module or from one or more pre-manufactured floor-ceiling panels and wall panels (not shown in FIG. 1), and the units may also adjoin each other via hallways having pre-manufactured corridor panels as floor panels. A floor-ceiling panel may form the floor of a first unit and a ceiling of a second unit below the first unit, and may also be used to form part of the roof of the building 100 when used as the ceiling panel for the top floor. The pre-manufactured wall panels may be used to form interior walls (e.g., demising walls, utility walls on a corridor, etc.), window walls (e.g., exterior window wall 104 that accommodate one or more windows 106), utility walls (e.g., walls with utilities such as plumbing and electrical wiring contained therein), side/end walls, etc. According to various embodiments, at least some of these panels may be pre-manufactured off-site, and then installed on site by coupling them together to construct the building 100. The various components of such panels and how such panels are attached to each other will be described later below.

The sides of interior walls that face the interior space (e.g., living space) of the building 100 may be covered by a finish panel, such as wall paneling, for decorative and/or functional purposes. Analogously, the tops and bottoms of floor-ceiling panels that face the interior space (e.g., living space) of the building 100 may also be covered with laminate flooring, finish panels, tile, painted/textured sheathing, etc. for decorative and/or functional purposes. For exterior walls such as end walls and window walls, the sides of these walls facing the outside environment may be covered with waterproofing membranes, tiles, glass, or other material for decorative and/or functional purposes.

According to various implementations, the building 100 is constructed using load bearing walls (such as demising walls, end walls, etc.). In this manner, such walls are able to support vertical loads, and non-shear walls are able to transfer lateral loads and shear walls are able to transfer and resist lateral loads. Because these walls are load bearing components, the building 100 can eliminate or reduce the use of an extensive steel structural frame in at least some of the levels. For instance, a steel structural frame (e.g., made of an array of beams and columns to which each and every floor-ceiling panel and wall are directly attached) may be absent in levels L2-L6. A steel structural frame may be used in level L1 and/or further structural reinforcement may be given to load bearing walls that are used in level L1 alternatively or in addition to a structural frame, so as to provide structural integrity at ground level.

The building 100, having six levels L1-L6, is defined in some jurisdictions as a mid-rise building (e.g., buildings having six to 12 levels). Buildings having five levels and under are defined in some jurisdictions as a low-rise building. The various embodiments of the load bearing walls described herein may be used in low-rise and mid-rise buildings. Such low-rise and mid-rise buildings may have various fire ratings, with a 2-hour fire rating for mid-rise buildings of six stories or more and a 1-hour fire rating for buildings of five stories or less being examples for some of the buildings that use the load bearing walls described herein.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

FIGS. 2-7 show an example construction sequence of a building 200, including installation of stair and elevator modules and a steel transfer structure, in accordance with some implementations. For purposes of example and illustration, the building 200 will have a generally rectangular footprint, and will be assumed to be a low-rise building having at most five stories (floor levels), and it is understood that the various implementations described herein may be used for buildings with other numbers of stories. The construction sequence shown in FIGS. 2-7 and in the other figures that will be shown and described later may be adapted to construct buildings having other shapes, sizes, heights, configurations, number of stories, etc., such as the building 100 of FIG. 1 or any other building where load bearing walls and the other building parts described herein are used in the absence of extensive structural frames on at least some stories. In some embodiments, the various operations in the construction sequence may be performed in a different order, omitted, supplemented with other operations, modified, combined, performed in parallel, etc., relative to what is shown and described with respect to FIGS. 2-7 and the other figures.

Figure 2:
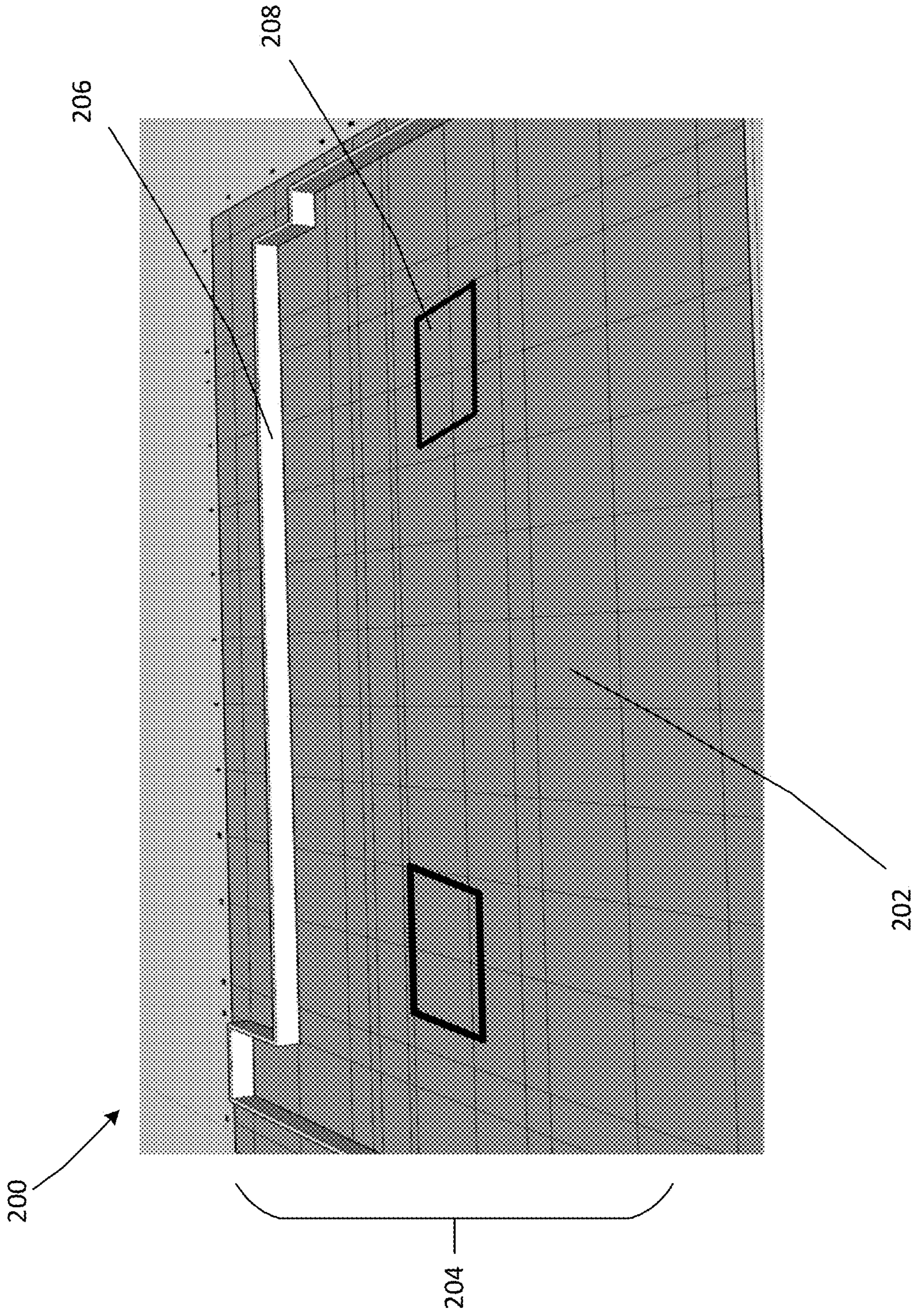
FIGS. 2-7 show an example construction sequence of a building, including installation of stair and elevator modules and a steel transfer structure, in accordance with some implementations.

In FIG. 2, a foundation 202 is first formed. The foundation 202 may be a steel-reinforced concrete slab that is poured on the ground to define a footprint 204 of the building 200, or may be some other type of shallow or deep foundation structure. Such a foundation structure may include, for example, foundation walls 206. Furthermore, excavation of the ground may also be performed to form a basement and/or elevator pit(s) 208 that form part of one or more elevator shafts to accommodate one or more elevators.

Figure 3:
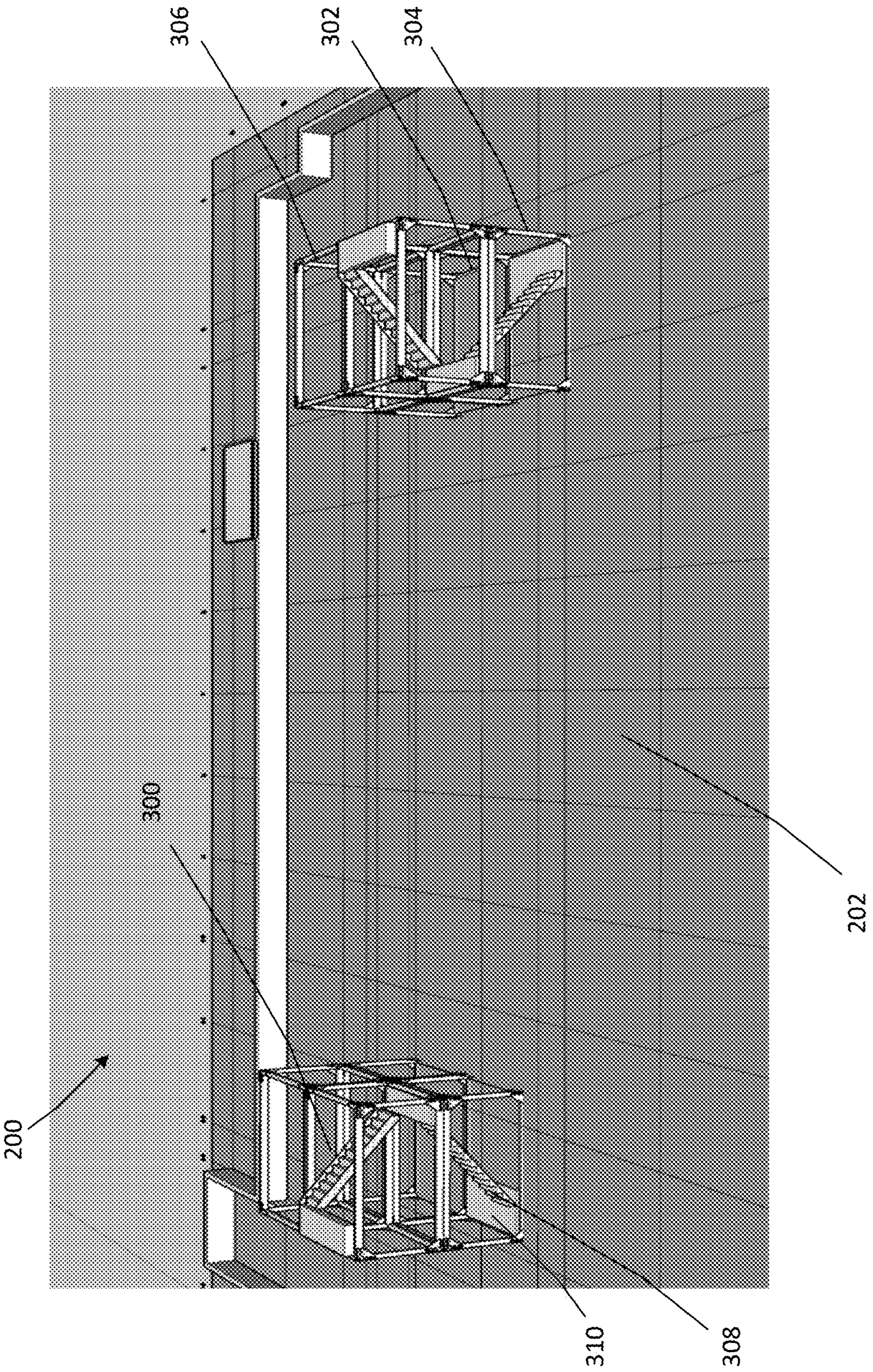

Next in FIG. 3, pre-manufactured stair and elevator modules 300 and 302 may be built on the foundation 202, and positioned such that the elevator portions of the modules 300 and 302 that will contain the elevator shaft are superimposed over the elevator pit(s) 208. The modules 300 and 302 according to various embodiments may be two stories in height, and there may be one or more of these modules per building, with two modules 300 and 302 shown by way of example in FIG. 3.

In some implementations, each of the modules 300 and 302 may be one story in height, with each module comprising necessary componentry to effectuate travel from a first level to a second level, the second level being above the first level. Multiple modules may be stacked and affixed upon each other to traverse multiple additional stories. Additionally, in some implementations, each of the modules 300 and 302 may be two stories in height, with each module comprising necessary componentry to effectuate travel from a first level to a second level, the second level being above the first level, and from a second level to a third level, the third level being above the second level. Other variations in a total number of stories serviced by a single module 300 or 302 are also applicable, depending upon any particular implementation.

Each of the modules 300 and 302 may be comprised of vertical columns 304 made of steel, and horizontal beams 306 spanning between the columns and also made of steel. Thus, the columns 304 and the beams 306 form a structural frame. In other embodiments, the columns may be replaced by load bearing wall panels and the beams may remain as load bearing rings.

As depicted in the example of FIG. 3, each level of a module, such as the module 300, includes a staircase 308 and a landing 310 for its stair portion, and as previously explained above, further includes an adjoining (that is superimposed over the previously constructed elevator pit) that will be occupied by the elevator shaft. In some implementations, the elevator portion of the module can sometimes be combined with the pit concrete formwork to create a complete starter module.

The modules 300 and 302 of various embodiments are positioned at specific locations of the foundation 202. In the example of FIG. 3, the modules 300 and 302 are positioned on opposite sides of the building 200. Other configurations may be used, such as positioning one or more modules at a central location in the building footprint or at any other suitable location(s) on the building footprint to enable the modules 300 and 302 to be used as erection aids for brace members, such as braced frames. This aspect will be described in further detail next with respect to FIG. 4.

Figure 4:
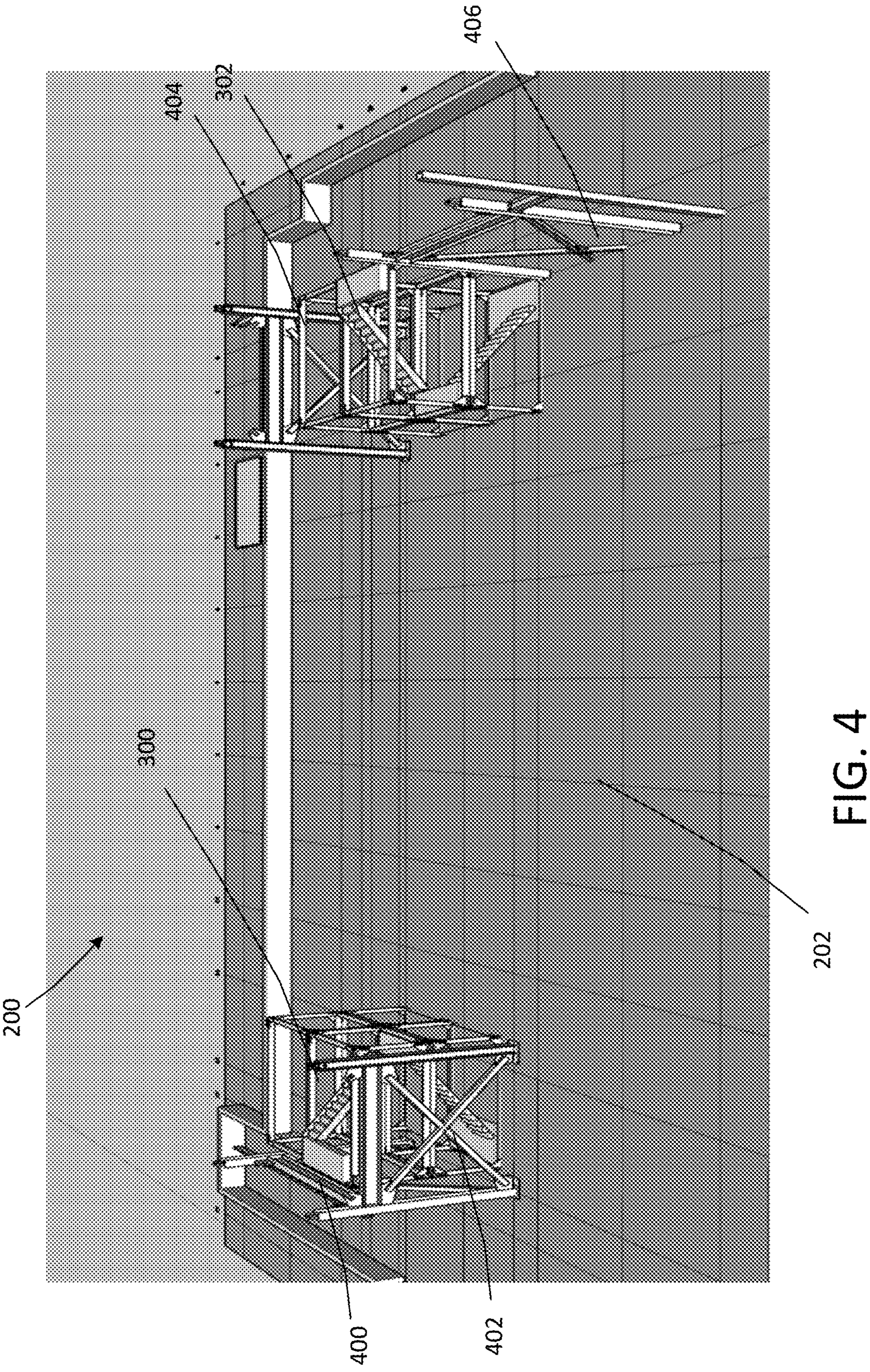

In FIG. 4, brace members such as braced frames are installed on the foundation 202 in relation to the modules 300 and 302. For example, braced frames 400 and 402 are arranged perpendicularly around and in close proximity to the module 300, such that the module 300 is nested by the braced frames 400 and 402. With respect to the module 302, braced frames 404 and 406 are also arranged perpendicularly relative to each other but spaced away from the module 302 by a greater distance.

The braced frames 400-406 may be arranged on the foundation 202 in any suitable location and orientation, dependent on factors such as the footprint or configuration of the building 200, source of lateral and/or vertical loads, location/orientation for optimal stabilization, etc. Any suitable number of braced frames may be provided at the ground level. The braced frames may further vary in configuration. The example of FIG. 4 depicts braced frames that are generally planar in shape (made of two columns and at least one horizontal beam that joins the two columns), with cross beams (X shaped beams) at the center of the braced frames. The braced frames 400-406 may span one, two, or other stories in height or intermediate heights.

According to various embodiments, the modules 300 and 302 are used as erection aids that guide the positioning and orientation of the braced frames 400-406. For instance, the modules 300 and 302 are installed first, and then the braced frames 400-406 are arranged relative to the location of the modules 300 and 302. The braced frames may be directly welded (or otherwise attached/connected) to the modules, or may be linked to the module(s) over a distance via linking beams or other structural framing. In this manner, the modules 300 and 302 stabilize the braced frames 400-406, and the braced frames 400-406 can operate to also absorb vertical and lateral loads from the building 200 via their linking connections.

Figure 5:
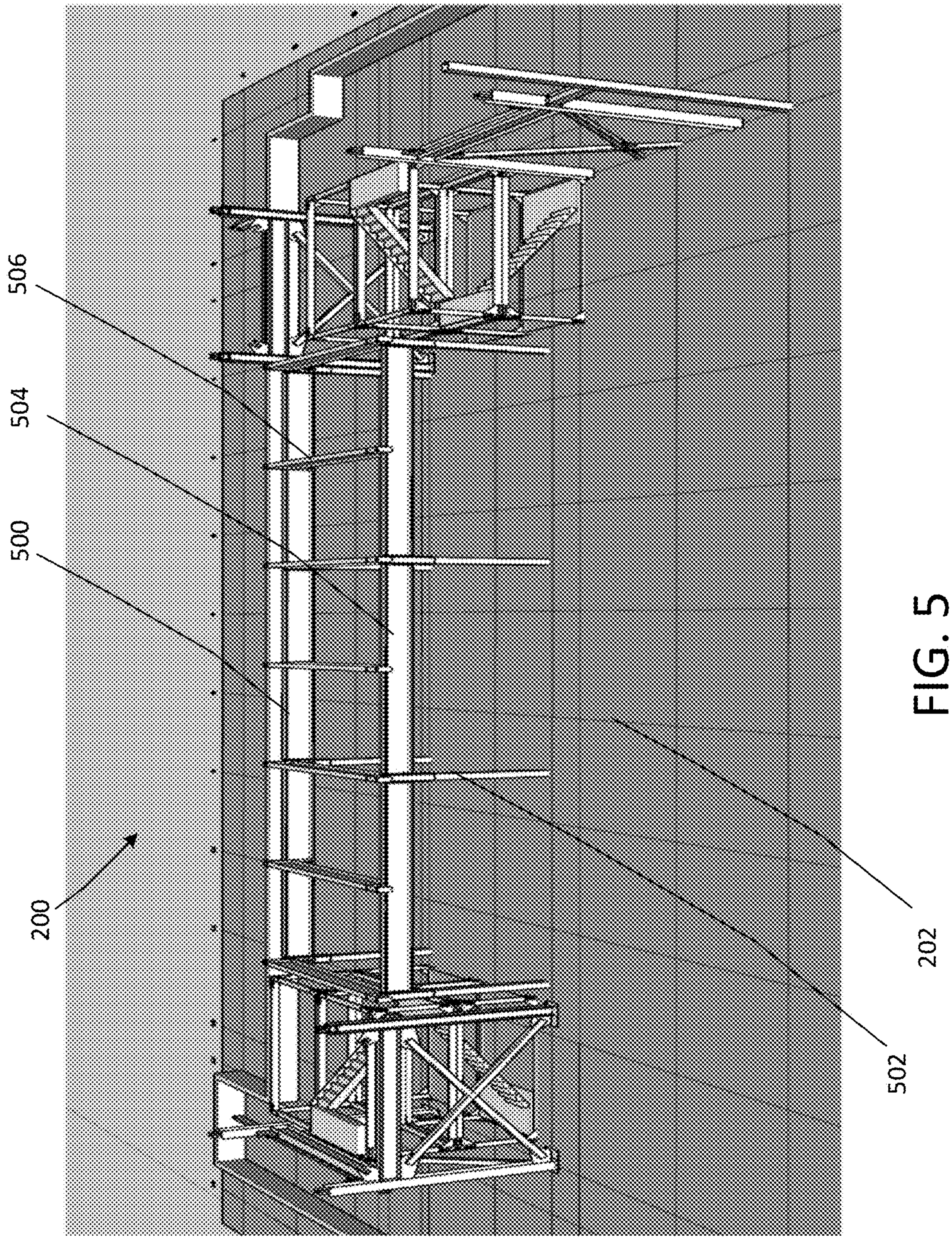
Figure 6:
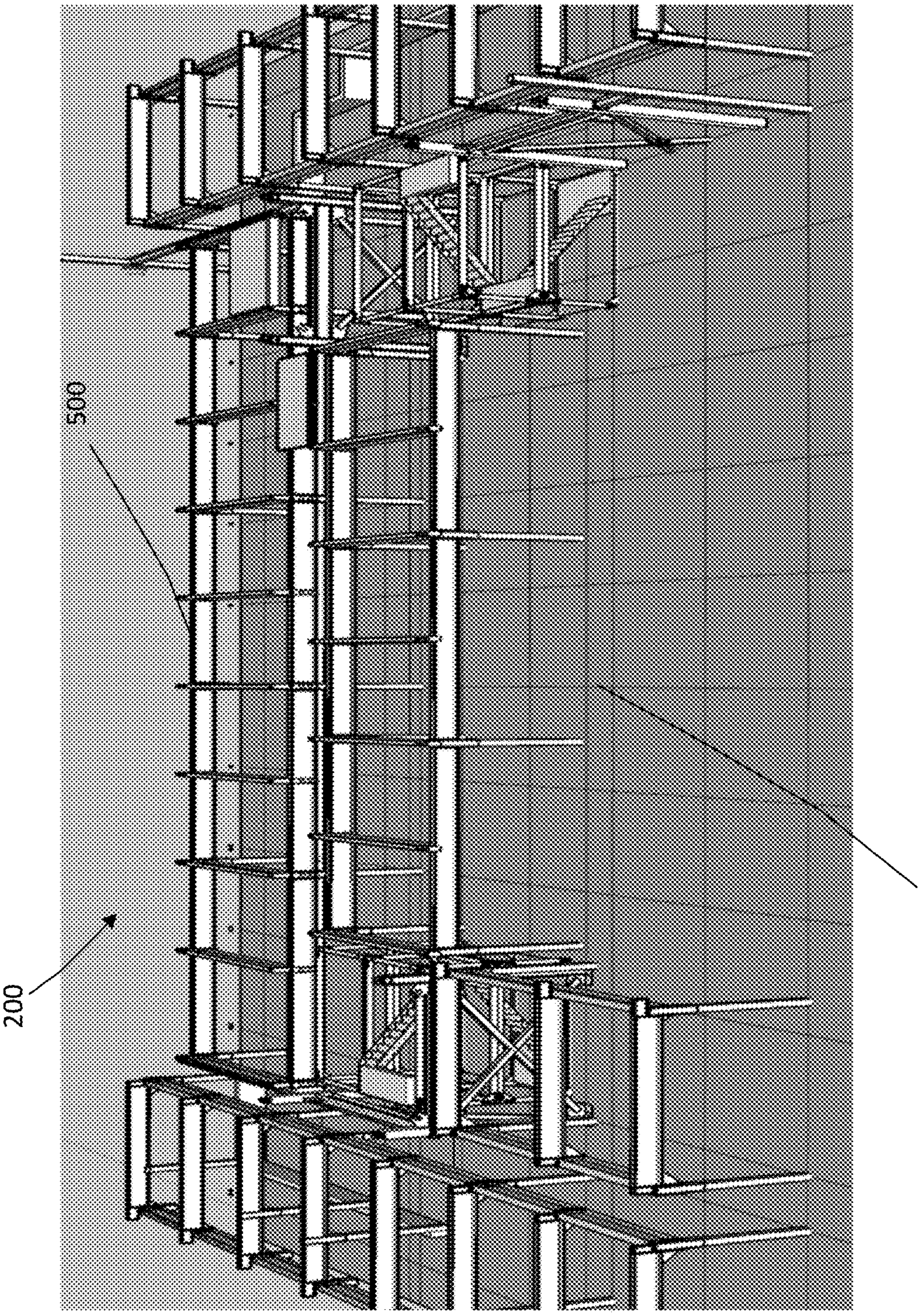

FIGS. 5 and 6 then depict the construction of a steel transfer structure 500 (e.g., a podium structure). The steel transfer structure 500 comprise a steel frame that receives and transfers load to the foundation 202. The steel transfer structure 500 may have vertical members 502 (columns) having a height that spans one story, girders 504 that join pairs of columns 502, and beams 506 that perpendicularly join pairs of girders 504. The steel transfer structure 222 may further include vertically oriented "spigots" and/or other protrusions or engagement features to aid in construction, as will be described more fully below.

According to various embodiments, such as the arrangement shown in FIGS. 5 and 6, columns 502 are positioned at every other beam 506. This arrangement enables more open space at ground level L1 (e.g., for lobbies, parking, offices, stores, etc.), without undue obstruction from multiple columns 502. According to one example that will be depicted next in FIG. 7, the space between consecutive beams 506 is sized to receive three adjoining floor-ceiling panels, although the size of the floor-ceiling panels and the space between consecutive beams 506 and girders 504 can vary from one implementation to another. For instance, some implementations may install multiple floor-ceiling panels between consecutive beams 506 that may vary in widths from 13 feet, to 16 feet, to 20 feet, to 24 feet, etc.

Figure 7:
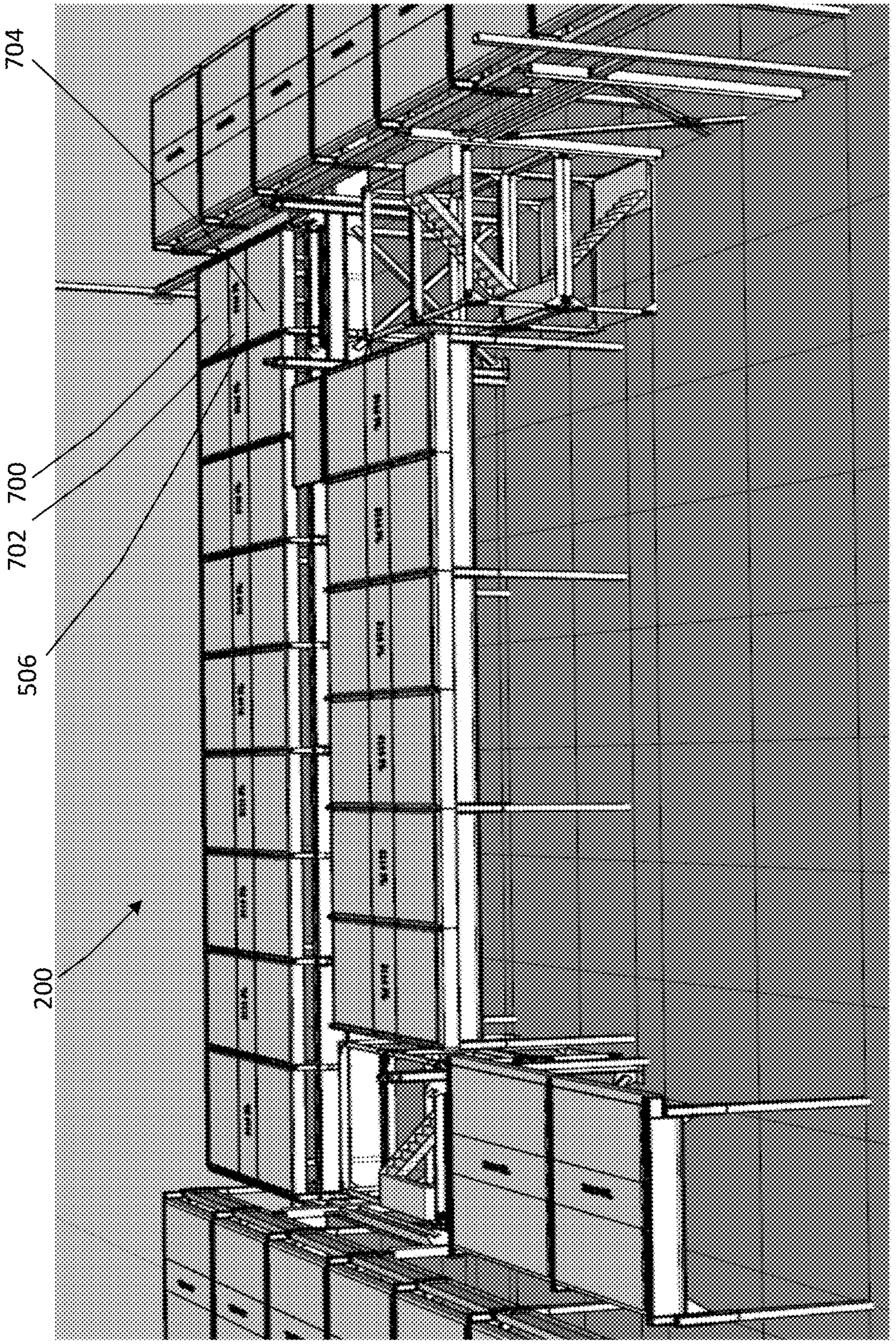

FIG. 6 shows the remaining parts of the steel transfer structure 500 being erected for the other sections of the ground level L1. FIG. 7 then depicts the placement of three floor-ceiling panels 700-704 over consecutive beams 506. In the example shown, the floor-ceiling panel 700 will be adjacent to a window wall (not yet installed in FIG. 7) that faces an exterior of the building 200, the floor-ceiling panel 704 will be adjacent to a utility wall (not yet installed in FIG. 7) that faces in interior corridor of the building 200, and the floor-ceiling panel 702 is a middle panel joined to and between the floor-ceiling panels 700 and 704.

An installation sequence for the floor-ceiling panels may involve installing the floor-ceiling 700, the floor-ceiling panel 702, and the floor-ceiling 704 in any suitable sequence, such as floor-ceiling panels 702-704-700. After these threes floor-ceiling panels are installed, then the installation sequence moves to the next adjacent space between consecutive beams 506 (e.g., to the left direction in FIG. 7) so as to install the next three floor-ceiling panels in the same manner. This installation sequence repeats until all floor-ceiling panels are installed on the steel transfer structure 500 as depicted in FIG. 7 to complete a floor deck for that story. Variations in the installation sequence are possible, such as the corridor panels and utility wall could precede the floor-ceiling panels, thereby erecting from the core outwards.

Figure 8:
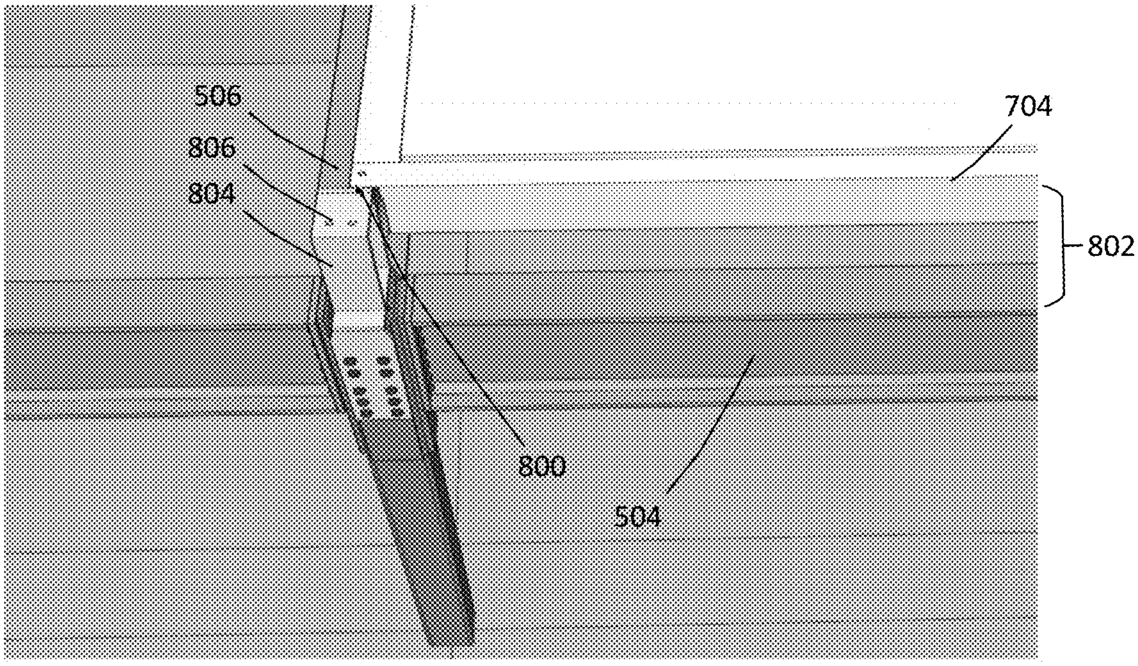
FIG. 8 shows an example mounting of a floor-ceiling panel in accordance with some implementations.

FIG. 8 shows an example mounting of a floor-ceiling panel (such as the floor-ceiling panel 704 of FIG. 7) in accordance with some implementations. If the north-south direction along the beam 506 is considered to be a transverse direction, and if the east-west direction along the girder 504 is considered to be the longitudinal direction, then the floor-ceiling panel 704 includes an angle (or other ledge-like structure) 800 that runs along its transverse direction along an upper surface (upper corner edge) of the floor-ceiling panel 704. It is understood that the terms longitudinal and transverse are used as relative terms herein for the sake of convenience in describing perpendicular/orthogonal relationships between two components in the various embodiments, and may be swapped if the building is being viewed or described from a different point of reference.

The angle 800 includes a horizontal section that rests on a top surface of the beam 506. A vertical section of the angle 800 is attached to a vertical edge of the floor-ceiling panel 704. A similar angle 800 is attached to the other/opposite transverse edge of the floor-ceiling panel 704, and also has a horizontal section that rests on top of a beam 506 adjacent to that side of the floor-ceiling panel 704. In this manner, the floor-ceiling panel 704 is hung by its transverse edges between two consecutive beams 506.

With such an arrangement, the floor-ceiling panels provide a horizontal diaphragm that absorbs lateral and/or vertical load(s) and then transfers the load(s), via the angle 800, to the beams 506 of the steel transfer structure 500. The steel transfer structure 500 then transfers the load(s) to the foundation 202 and/or to the braced frames (e.g., the braced frames 400-406) via connecting links.

According to some embodiments, the floor-ceiling panels are supported between beams 506 along their transverse sides and are unsupported by the girders 502 along their transverse sides. In the example of FIG. 8 and as will be explained later below, there may be a gap 802 between the transverse edge of the floor-ceiling panel 704 and the girder 504. The gap may be absent in other embodiments. This gap 802 may be sized to accommodate the thickness of a utility wall that will be hung from walls that will rest on top of the beams 506, with the gap also providing an opening to enable utilities installed in the utility wall to extend and connect to utilities at the floor level below (and similarly extend/connect to utilities installed in utility wall at a floor level above).

FIG. 8 also shows an embodiment wherein a mounting base 804 is attached to or integrated the steel structural frame 500. The mounting base 804 may be welded or bolted to the steel structural frame 500 and may be located at end points of the beams 506, where the beams 506 intersect with the girders 504.

As shown in FIG. 8, the mounting base 804 may include a plurality of through holes 806 on an upper surface of the mounting based 804. A captive nut or a loose nut may be located at one end of the through hole, underneath the upper surface of the mounting based 804, for receiving a threaded bolt. The purpose of the mounting base 804 and its through holes 806 will be described next with respect to FIGS. 9 and 10. Such arrangement may be used the next floor levels, so as to align and secure a particular load bearing wall on that next floor level with/to another load bearing wall beneath it, and/or to other wise provide self-alignment and self-standing capability for the particular load bearing wall.

Figure 9:
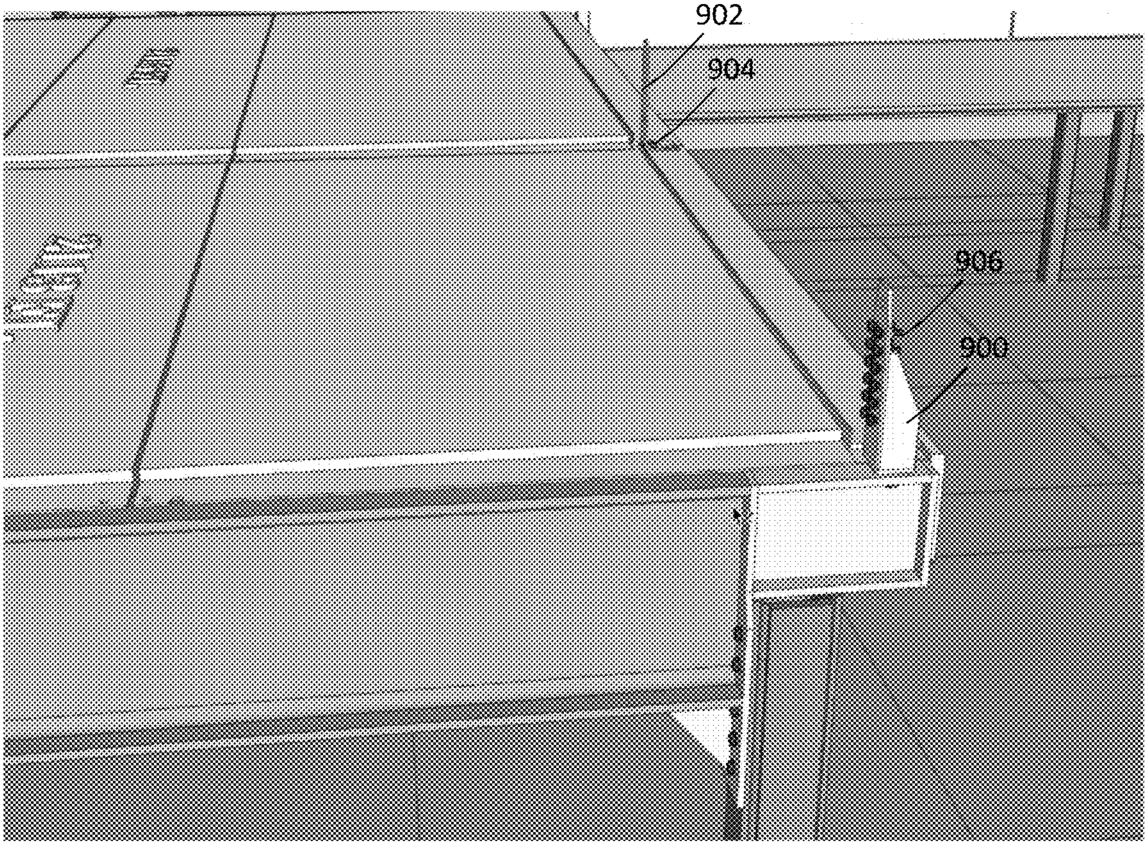
FIG. 9 shows an example spigot for alignment and stabilizing in accordance with some implementations.

In FIG. 9, spigots 900 and 902 (or other protrusion) are attached to respective mounting bases that are in turn attached to the steel structural frame 500 via bolts or other attachment technique. For example, bolts 904 may attach the spigot 902 to the mounting base 804, with the bolts 904 running through a base of the spigot 902, then through the through holes 806, and then tightened into place and securely by nuts. While this arrangement is depicted in FIG. 9 for spigots affixed to the steel structural frame 500 using mounting bolts, other implementations may have the spigots welded or integrally formed with the steel structural frame 500. The foregoing description using bolts that affix the spigot to an underlying component is also applicable to floor levels above the second story, wherein the spigots may be affixed to the top ends of tubular members of walls beneath them via a cap attached to the top end of each of the underlying tubular members, with the mounting bolt of the spigot engaging with a captive nut on the underside of the cap.

The spigots 900 and 902 (and other spigots on subsequent upper stories and that are linearly aligned with the spigots 900 and 902) serve at least two purposes. First, they perform an alignment function in that the spigots may be inserted into vertical tubular members (studs) that are internally located along the vertical edge of demising or end walls. Thus, such walls may be self-aligning in that so long as the spigots are able to be inserted into their tubular members, the walls would then be properly positioned/aligned on top of a beam 506 and perpendicularly to a girder 504.

Second, the spigots 900 and 902 perform a stabilization function in that when the spigots are inserted into the tubular members of the walls and then bolted to the walls, the spigots hold the walls in place. Thus, since the spigots 900 and 902 are securing walls in place (at opposite ends of the walls), no additional bracing for the walls are needed. The spigot 900 may have a braced bracket configuration and includes a relatively high number of bolts 906 for attaching to a wall, in this case a shear wall (e.g., an end wall that is a shear wall) that would require more secure attachment so as to resist overturning uplift movement and/or other movement. In comparison, the spigot 902 has a more knife-like non-braced configuration and may include a relatively lower number of bolts for attachment to a wall, since the spigot 902 would be inserted into the wall (such as a demising wall) that may be load bearing (e.g., vertical loads) but is not a shear wall. More robust spigot forms (e.g., with additional bracing such as the spigot 900) may be used for affixing load bearing walls that are shear walls.

When a mounting bolt of a spigot is tightened downward (e.g., on site with a tool prior to tubular member of an upper wall being lowered into position around that spigot), the bolt stiffens the connection between the spigot and the tubular member below. Thus, when there are multiple spigots arranged vertically between and that join together serially/vertically positioned tubular members (in combination with a cap and other parts of a stiffening assembly affixed to the end of the tubular member and adjacent to the spigot that attaches to the stiffening assembly), a result is stiffer joints between tubular members along the vertical direction, thereby providing a feature by which shear walls affixed to the spigots resist axial overturning forces during a seismic event. Also, the tightened mounting bolts provide additional tension between the tubular members to further securely hold the walls in place. The stiffening assembly may be comprised of the cap and an orthogonal protrusion formed with or affixed to the bottom of the cap. The stiffening assembly is inserted into the open end of the tube such that the protrusion lies in a vertical plane and extends through a vertical slot formed in the wall of the tube, while the cap is oriented horizontally to cover the top opening of the tubular member.

Figure 10:
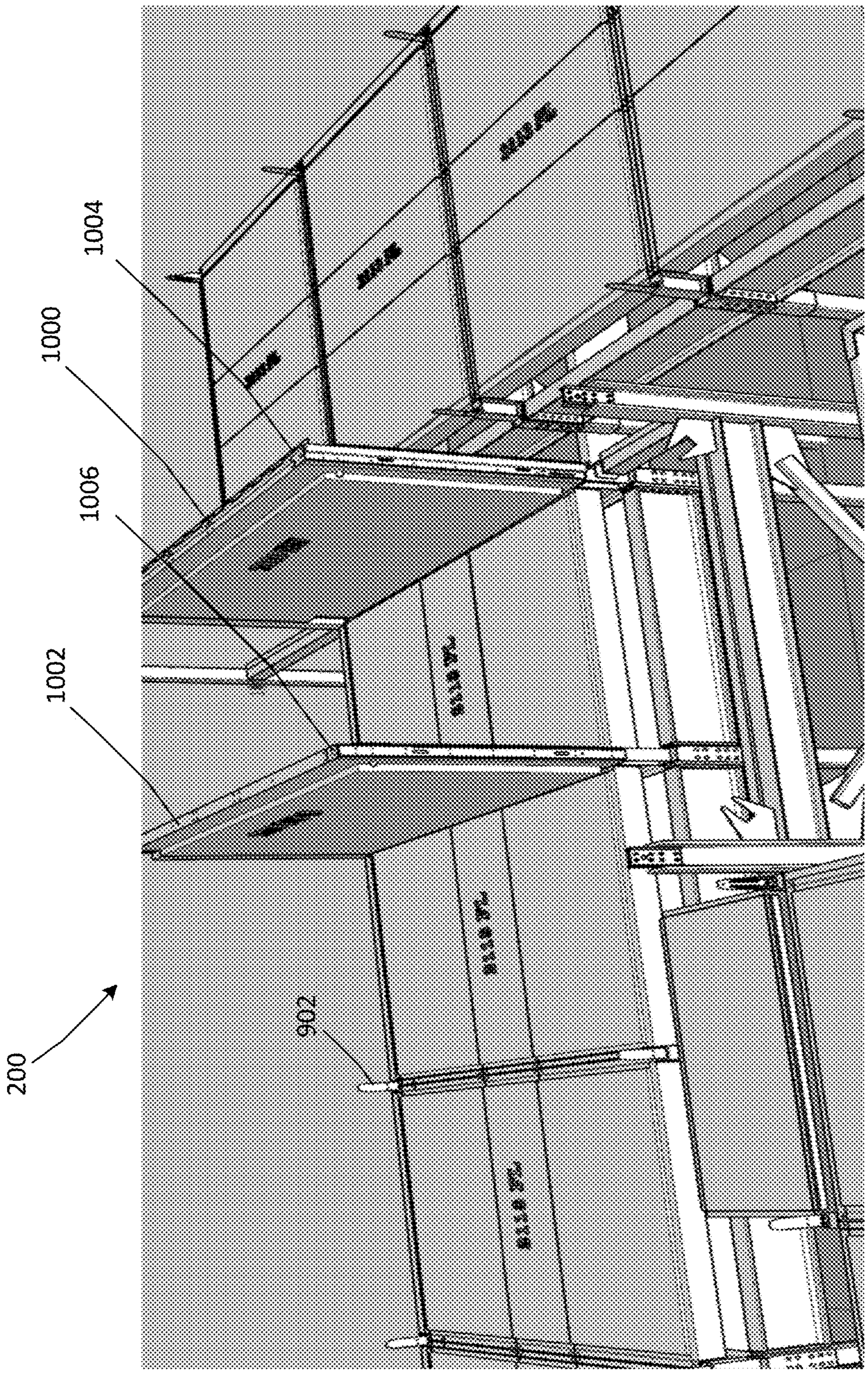
FIGS. 10 and 11 show further examples of the construction sequence, including installation of end, demising, and utility walls, in accordance with some implementations.

FIG. 10 depicts such alignment/placement and securing of the walls, using spigots, in more detail. More particularly, an end wall 1000 and a demising wall 1002 are installed by positioning these walls over the beams 506. Both of the walls 1000 and 1002 are load bearing walls. The end wall 1000 is also a shear wall, and the demising wall 1002 may or may not be a shear wall. In general, various structural configurations may be used to enable a wall to be a shear wall so as to resist in-plane shear and overturning forces. For example, stronger stud configurations or wall material may be used, as well as more dense screw patterns for attaching metal sheets to the walls and augmentation of vertical connections between panels at end studs (tubular members).

In the example of FIG. 10, the end wall 1000 may include a tubular member 1004, such as a hollow structural section (HSS) tube, along both of its vertical edges. As the end wall 1000 is being lowered into position, the spigots 900 (located proximate to both ends of the beam 506) are inserted into the openings of the lower ends of the tubular members 1004. The end wall 1000 is then secured in place by tightening the bolts 906 and by affixing a lower edge of the end wall 1000 to the upper surface of the floor-ceiling panels, which will be shown and described in further detail below with respect to FIG. 20.

A similar procedure may be used to install the demising wall 1002, by inserting spigots 902 into the openings at lower ends of tubular members 1006 at the vertical edges of the demising wall 1002 as the wall is lowered. A result of this installation is shown in FIG. 10, wherein two parallel walls are now standing without the need for additional bracing from structural framing (e.g., an internal framing/skeleton of the building 200).

Figure 11:
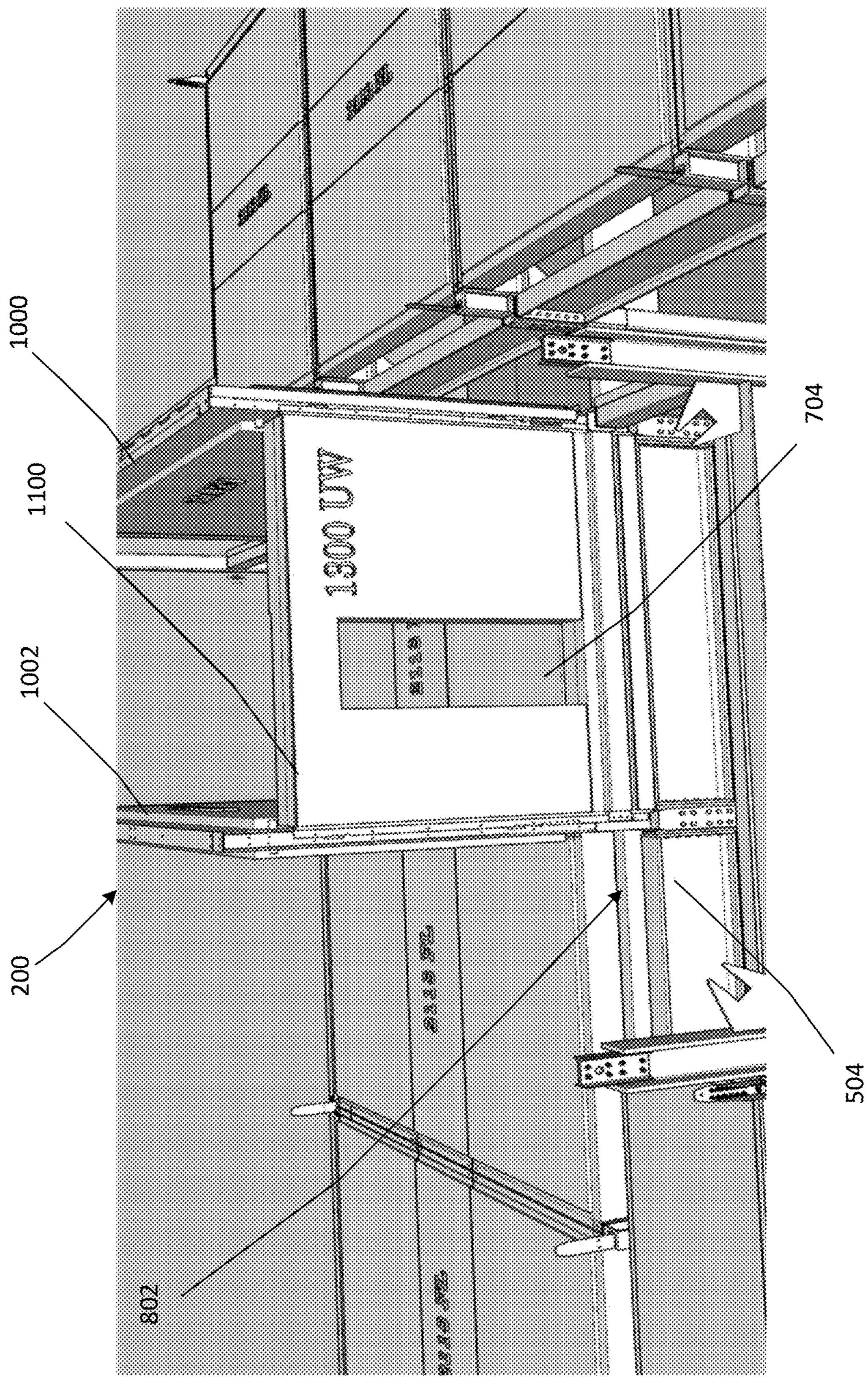

FIG. 11 shows a next phase of the construction sequence, wherein a single-story utility wall 1100 is hung from the walls 1000 and 1002. As previously explained above with respect to FIG. 8, the utility wall 1100 is positioned in the gap 802 between the floor-ceiling panel 704 and the girder 504.

According to some embodiments, the utility wall 1100 may be attached, such as by hanging/mounting, to the walls 1000 and 1002. A horizontal gap (for example 1 inch) may be maintained at the seam to the girder 504 (or to the preceding utility wall when above floor level L2). This horizontal gap allows the utility wall structure to follow structural datum created by bearing beams/walls, and absorbs construction/fabrication tolerance. The horizontal gap may be sealed with a foam gasket where required for weatherproofing, fire proofing, etc.

Figure 12:
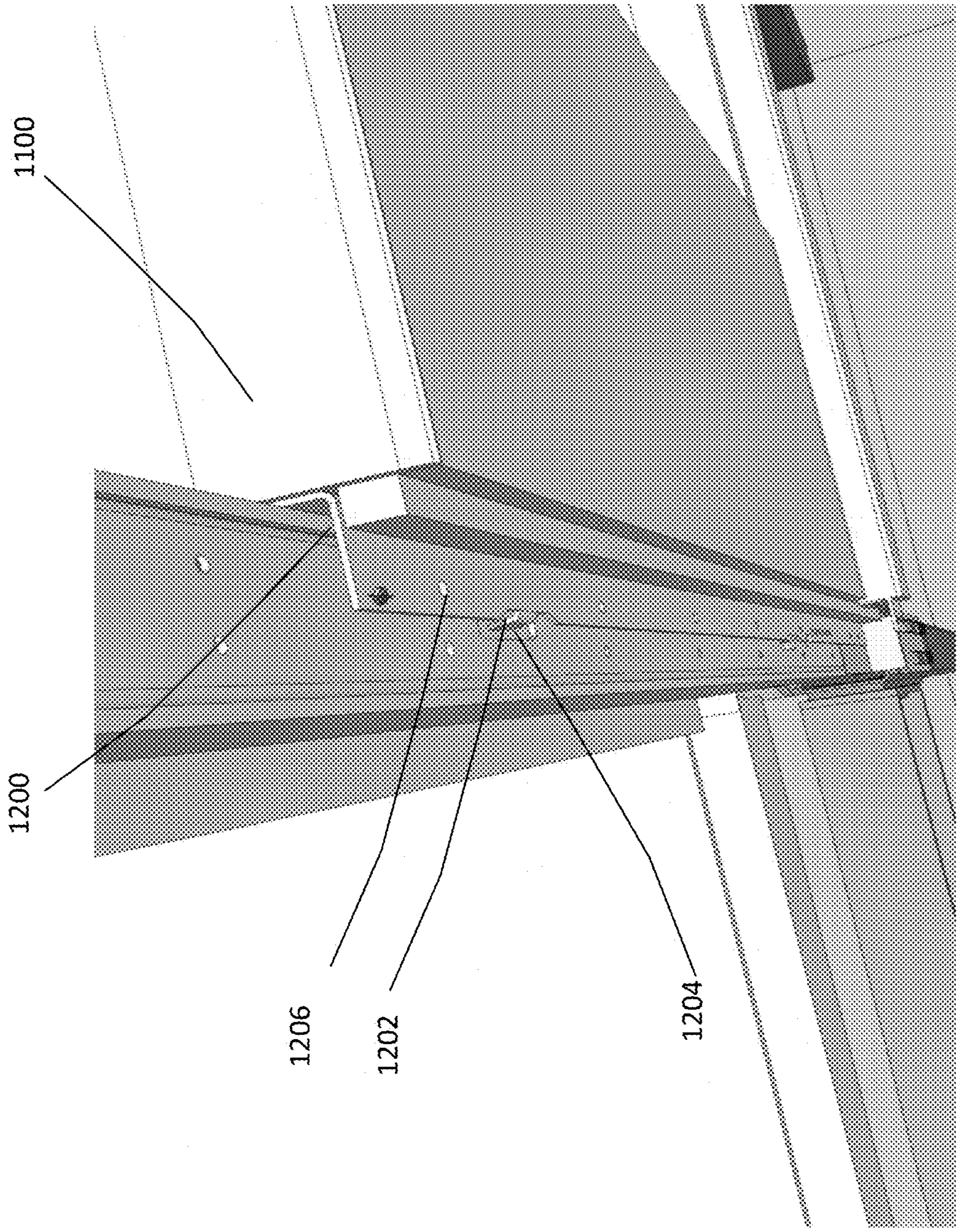
FIG. 12 shows an example mounting of a utility wall to a demising or end wall in accordance with some implementations.

FIG. 12 shows an example mounting of the utility wall 1100 to the demising wall 1002 (and mounted in a similar manner to the end wall 1000), in accordance with some implementations. The utility wall 1100 includes an angle 1200 that runs along both of its vertical edges. The angle 1200 includes a plurality of tabs 1202 that fits into slots 1204 of the demising wall 1002. For example, the slots 1204 may be formed in the same tubular member 1006 (of the demising wall 1002) that was inserted over the spigot 902.

The tabs 1202 may have any suitable shape. For example, the tabs 1202 may have a tapered shape so as to be more easily inserted into the slots 1204. The tabs 1202 may also have a hook-shaped configuration in some implementations, so as to provide more secure placement. In still other implementations, the tabs 1202 may be located on the demising wall 1002, and the slots 1204 may be located on the utility wall 1100.

Further attachment mechanisms may be used to hold the utility wall 1100 in place. For instance, the angle 1200 may be provided with holes 1206 to receive screws or bolts to further securely attach the utility wall 1100 to the demising wall 1002.

Figure 13:
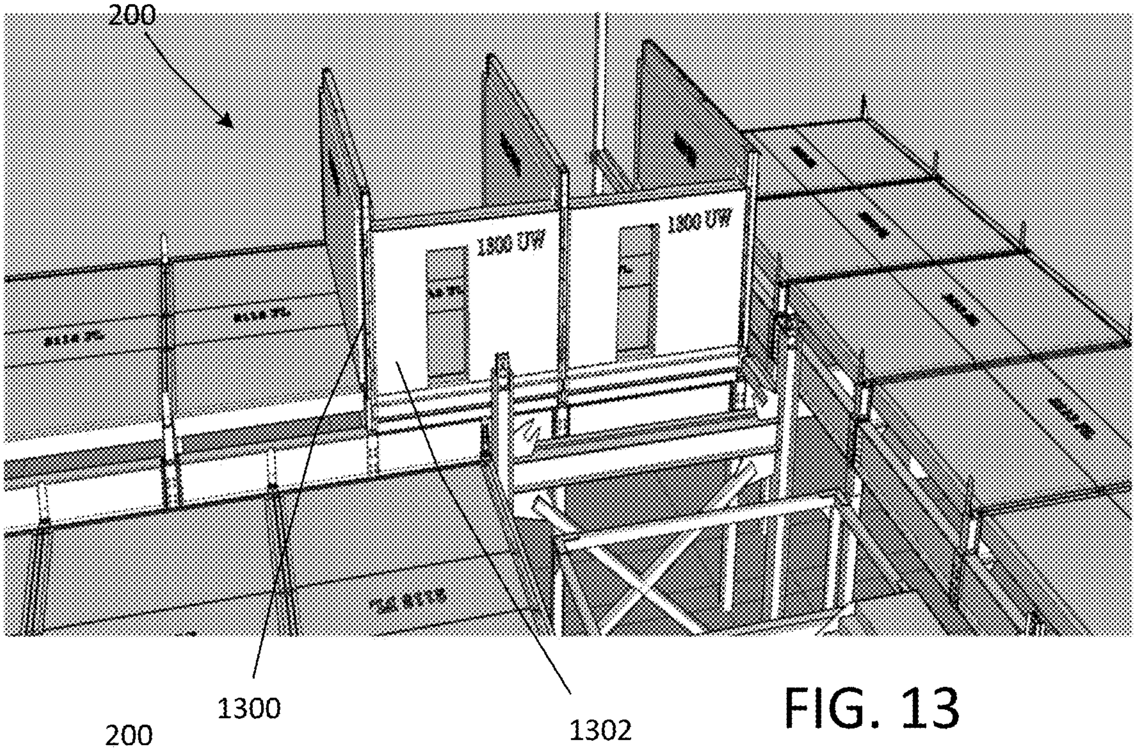
FIGS. 13-15 show further examples of the construction sequence, including installation of additional end, demising, and utility walls, in accordance with some implementations.
Figure 14:
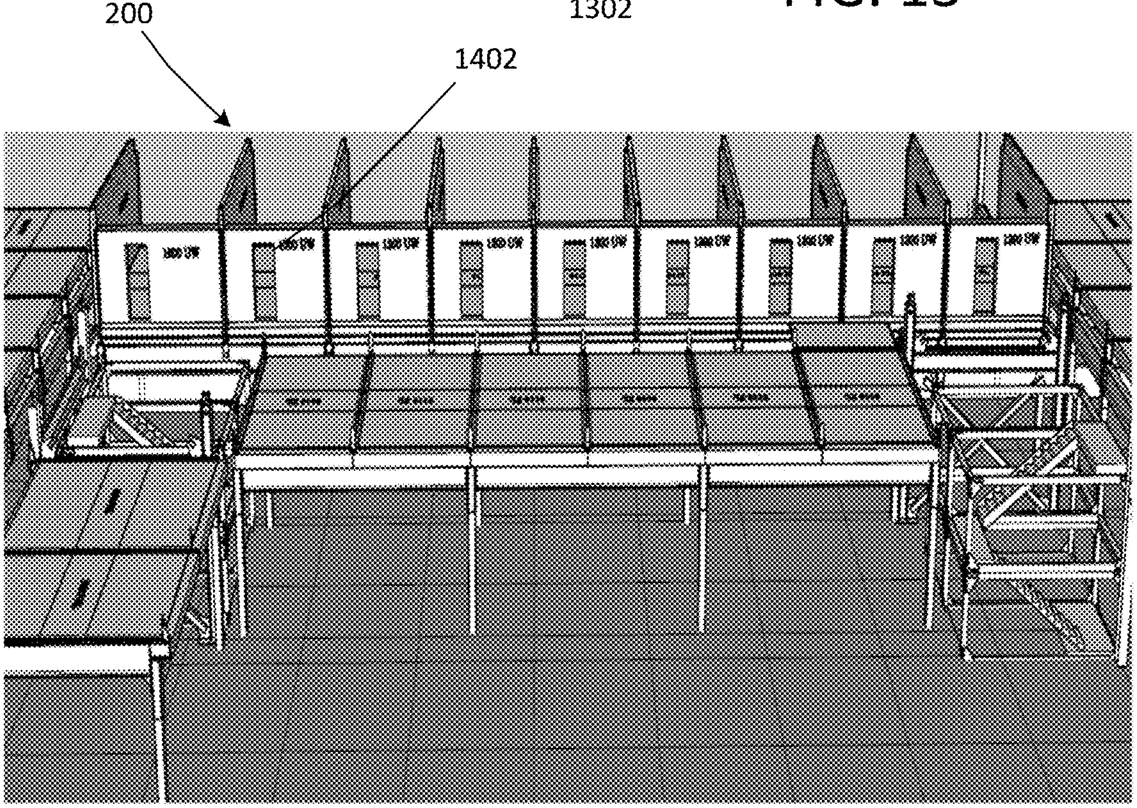

FIGS. 13 and 14 show the next phases of the construction sequence, wherein the next consecutive demising walls 1300 etc. and utility walls 1302 and 1402 etc. are installed one after another along the corridor of the building 200. Thus in the example of FIGS. 13 and 14, the installation of the walls is in the sequence of: install next demising wall, install next utility wall, install next demising wall, install next utility wall, etc.

This is just one possible example of the installation sequence. In another installation sequence, all four sides of a living space (e.g., a box) is completed, before proceeding with the installation of the walls of the adjacent living space to form the next box.

Figure 15:
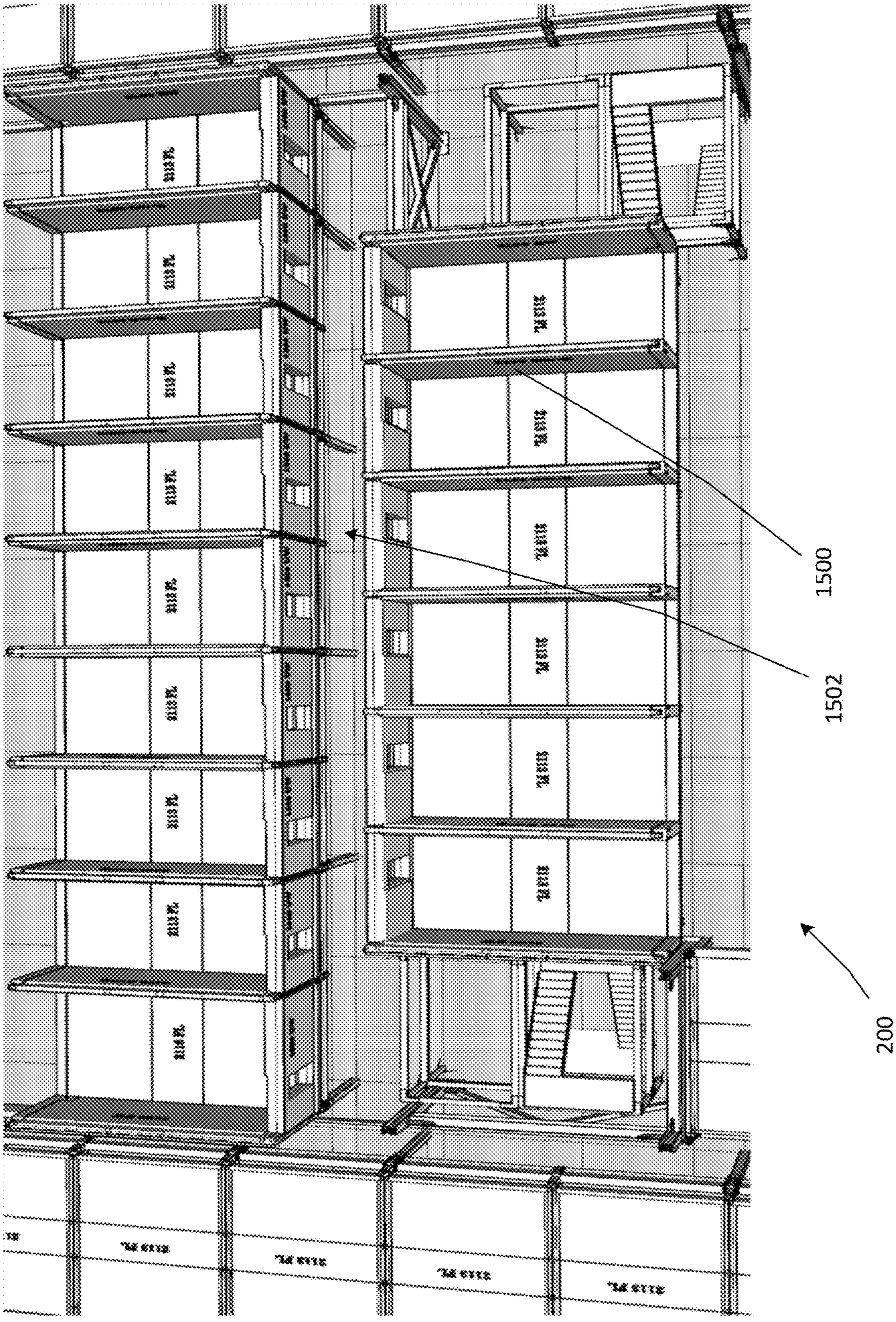

FIG. 15 shows the next phases in the construction sequence, wherein the walls 1500 (e.g., demising, end, and utility walls) across a corridor 1502 are installed. The process described above is repeated until all of the end walls, demising walls, and window walls are in place for the second level L2, such as when completing a "box" for each unit.

Figure 16:
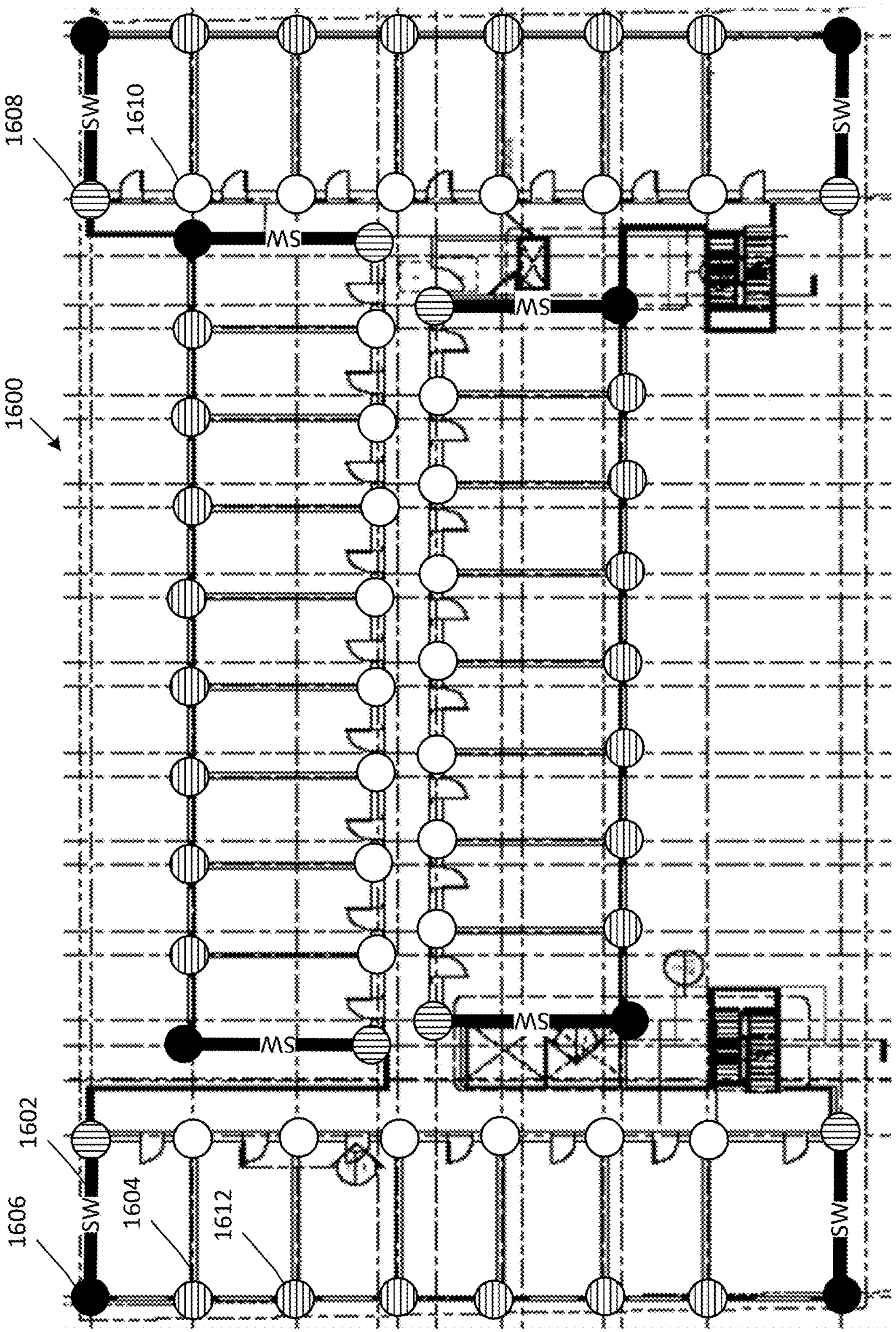
FIG. 16 is a drawing of an example floor plan of a building showing shear walls and other load bearing walls in accordance with some implementations.

The examples above described the end wall 1000 as being a shear wall. According to some embodiments, not all walls on a given floor level are configured as shear walls. Shear walls are configured where shear forces are expected to be significant, and so only a fraction of walls per floor level may perhaps be configured as sheer walls, although some implementations may configure more walls (including demising walls) as shear walls. FIG. 16 is a drawing of an example floor plan 1600 of a building (such as the building 200) showing shear walls and other load bearing walls in accordance with some implementations.

In FIG. 16, shear walls 1602 are indicated by heavier (thicker) lines that are labeled "SW" for "shear wall." In the example of FIG. 16, the building has eight shear walls 1602 on this particular floor level, while a greater number of all other walls (e.g., load bearing demising walls 1604 and other interior walls) are shown by thinner line weight and with no specific labeling.

FIG. 16 also shows an example of the various stud arrangements that may be used in some implementations. Arrangement 1606, represented by solid black circles at the exterior end of the shear walls 1602, may be studs having a first configuration. Also for the shear walls 1602, arrangement 1608 represented by circles with vertical hatching at the interior end of the shear walls 1602, may be studs having a second configuration.

For the demising walls 1604, arrangement 1610 represented by circles with white centers at the interior end of the demising walls 1604, may be studs having a third configuration. Also for the demising walls 1604, arrangement 1612 represented by circles with horizontal hatching at the exterior end of the demising walls 1604, may be studs having a fourth configuration. These various configurations of the studs may be in the form of gauges of the metal for the studs, the number of studs used at particular ends, the positioning of the studs, the shapes of the studs, and/or other configurations that may vary from one wall/location to another dependent on the shear forces that their respective walls are expected to encounter and resist.

Figure 17:
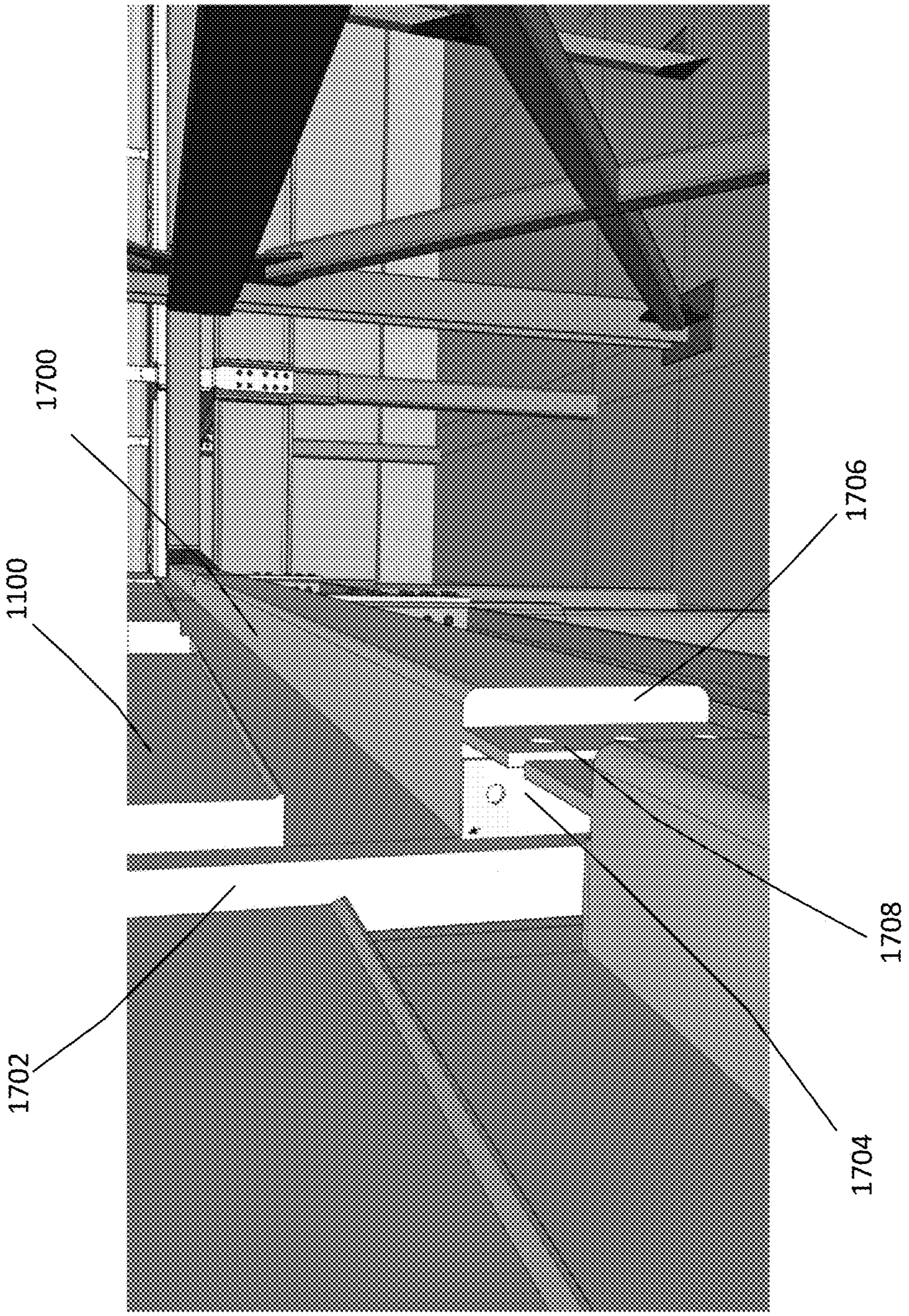
FIG. 17 show example components of a utility wall that may be used to mount corridor panels in accordance with some implementations.

The next phase of the construction sequence involves hanging corridor panels (which may be formed similarly as the floor-ceiling panels) from the utility walls (e.g., the utility wall 1100). FIG. 17 show example components of the utility wall 1100 that may be used to mount corridor panels in accordance with some implementations.

More particularly, the utility wall 1100 may include a horizontal member 1700 (such as a HSS tube) horizontally affixed to a lower portion of the utility wall 1100 near the floor. The horizontal member may be bolted or welded, for example, to the vertical studs of the utility wall 1100.

Furthermore, the utility wall 1100 may include a vertical end member 1702 (e.g., made of steel) that runs along the vertical edge of the utility wall 1100 and which is attached to an outermost stud at the edge/end of the utility wall 1100. The vertical end member 1702 includes a tab section 1704 that is attached (such as via bolting or welding) to an end member 1706 (made of metal) that is inserted into the open end of the horizontal member 1700.

The end member 1706 in turn has a tab section 1708 that protrudes towards a corresponding tab section of an adjacent horizontal member of an adjacent utility wall. Via a plate and bolts (not shown) these two tab sections may be joined together so as to provide a linking connection for transferring lateral load.

Figure 18:
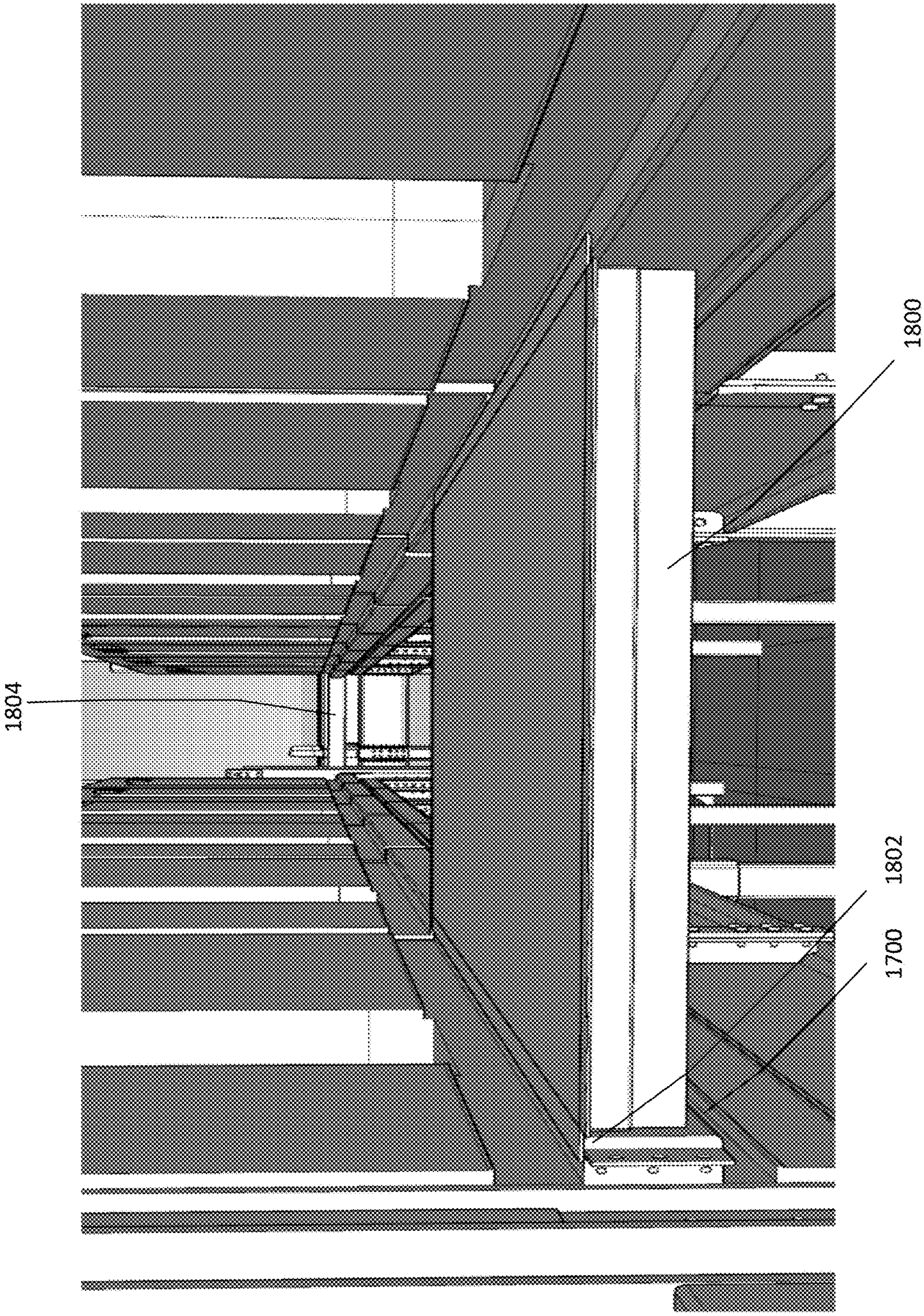
FIG. 18 shows a further example of the construction sequence, including mounting of a corridor panel to a utility wall, in accordance with some implementations.

The horizontal member 1700 has an upper surface, on which an angle of a corridor panel may rest, thereby hanging the corridor panel from the utility wall. FIG. 18 shows such mounting of a corridor panel 1800 to the utility wall 1100, in accordance with some implementations.

As shown in FIG. 18, the corridor panel 1800 includes an angle 1802 that runs along both opposing upper edges of the corridor panel 1800. The angle includes a horizontal section that rests on top of the horizontal member 1700 on one side of the corridor panel 1800, and a similar arrangement is present on the opposite side of the corridor panel 1800.

The corridor panel 1800 may then be fastened securely in place, such as by bolting, screwing, or welding the angle 1802 to the horizontal member 1700.

It is further noted that one or more linking members 1804 (such as beams) may be used to link the horizontal member(s) 1700 to the braced frames (e.g., the braced frames 300 and 302), thereby providing a path to transfer lateral load from the walls/panels to the braced frame and stair and elevator modules.

With the foregoing, the floors and walls of the second floor level L2 have completed their installation. The construction sequence then moves to the next (third) floor level L3, and the process described above generally repeats, including installing the next upper level(s) of braced frames and stair and elevator modules.

Figure 19:
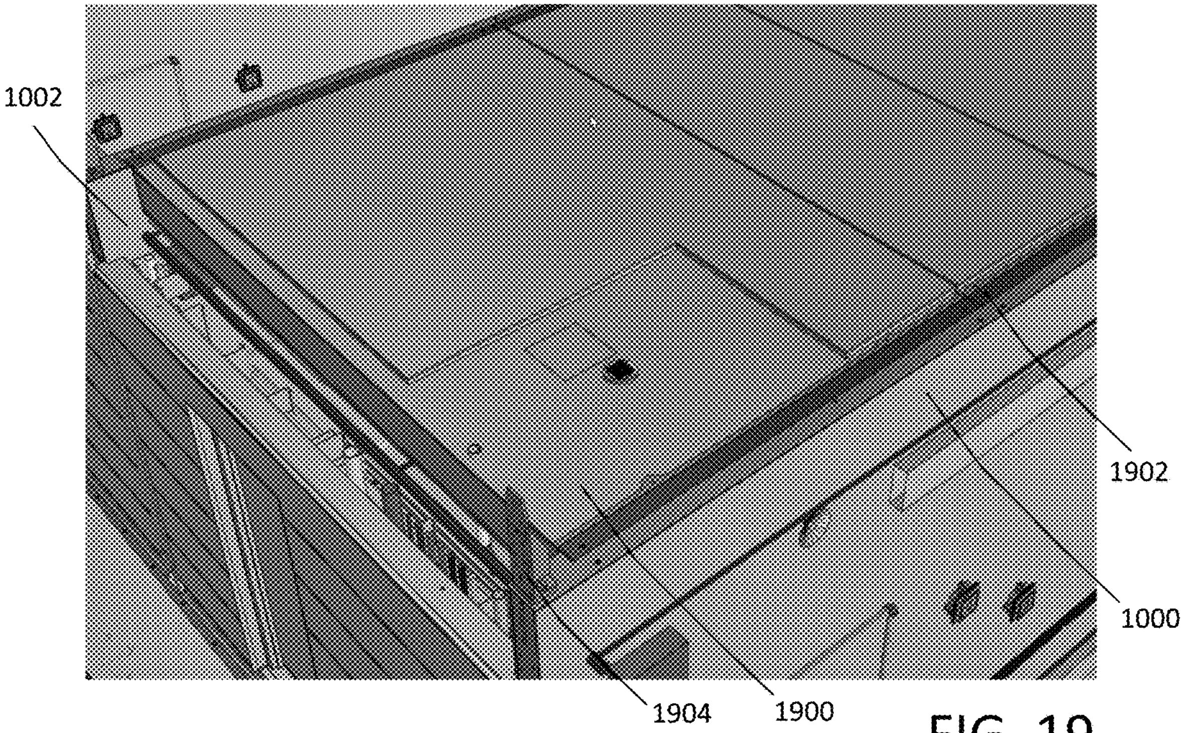
FIG. 19 shows a further example of the construction sequence, including installation of a floor-ceiling panel on a next floor level of the building, in accordance with some implementations.

Referring next to FIG. 19, FIG. 19 shows a further example of the construction sequence, including installation of a floor-ceiling panel 1900 on the next floor level of the building 200, in accordance with some implementations. Somewhat analogous to what has been previously described with respect to hanging floor-ceiling panels from beams of the steel transfer structure, the floor-ceiling panel 1900 is now hung from the top surfaces of the end wall 1000 and demising wall 1002.

Holes 1902 formed in the angle of the floor-ceiling panel 1900 facilitate the alignment and positioning of the floor-ceiling panel 1900. For instance, temporary pegs or screws may be inserted into the holes 1902 to hold the floor-ceiling panel 1900 in place, while the angle is screwed, bolted, or welded to a top plate of the walls 1000 and 1002. The holes 1902 (with temporary pegs or other holding devices inserted therein and through the corresponding holes in the top plate of the underlying wall) each provide a connection point that holds the floor-ceiling panel 1900 in place for precision and safety during building erection. This fastening also creates a tight joint for weld setup, for welding the angle of the floor-ceiling panel to the top plate of the wall.

Moreover, spigots 1904 may be installed on top of the walls 1000 and 1002, for alignment and securing of the end walls and demising walls that will be installed next. Such an installation was described previously above with respect to FIGS. 8-10.

Figure 20:
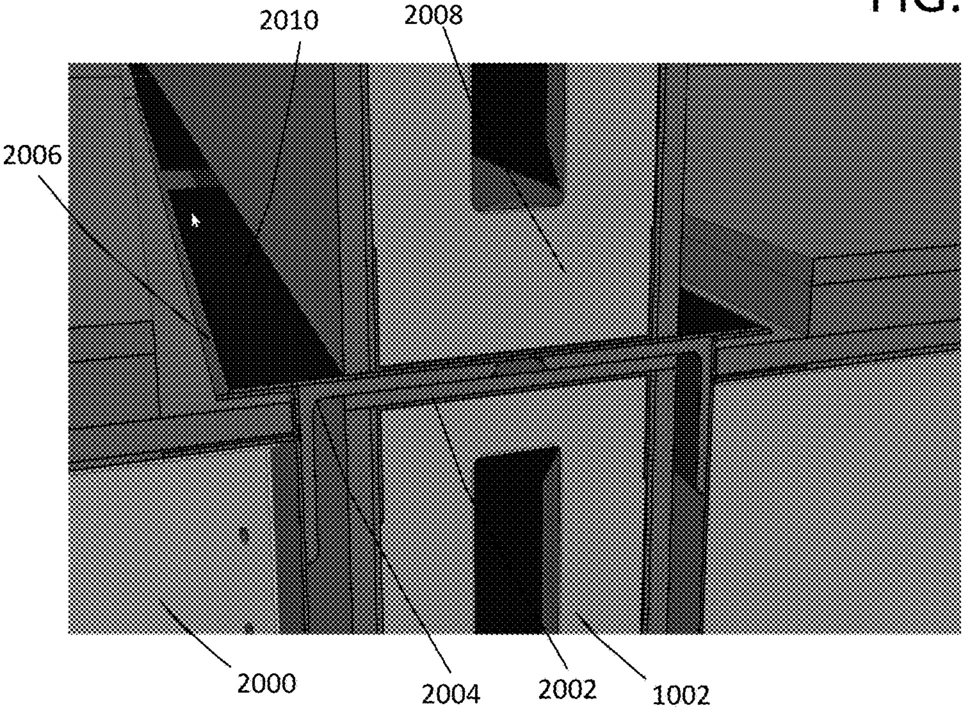
FIG. 20 shows further details of an example mounting arrangement of a floor-ceiling panel to a load bearing wall, in accordance with some implementations.

FIG. 20 shows further details of an example mounting arrangement of a floor-ceiling panel 2000 to a load bearing wall (e.g., the demising wall 1002), in accordance with some implementations. More specifically, FIG. 20 show a plate 2002 serving as a head plate at the top of the demising wall 1002. The horizontal section (flange) of an angle (L-shaped member) 2004 of the floor-ceiling panel 2000 then rests on top of the plate 2002, which may be welded to the plate 2002 along the entire length of the angle/plate that spans the upper surface of the demising wall 1002.

Prior to installation of the floor-ceiling panel 2000 as shown in FIG. 20, a shear angle 2006 may have a vertical section welded to the angle 2004 and a horizontal section welded to an upper surface of the floor-ceiling panel 2000.

The vertical section of the angle 2004 is also welded to the top section of the floor-ceiling panel 2000, thereby forming a T-shaped element at the upper corner edge of the floor-ceiling panel 2000.

An upper demising wall 2008 has a corresponding horizontal member 2010 that is affixed to the upper surfaces of the angles 2006 and 2004, thereby mounting the upper demising wall 2008 over the lower demising wall 1002. The horizontal member 2010 may be affixed to the angle 2006 such as by screwing, welding, or bolting.

Affixing the upper demising wall 2008 to the floor-ceiling panel 2000 in this manner enables lateral load to transfer from the upper demising wall 2008 to the horizontal plate 2010, and then to the shear angle 2006 and angle 2004. The lateral load can then transfer across the diaphragm formed by the floor-ceiling panel 2000 and/or transfer to an attached linking connection to the braced frames.

In the case that the depicted walls are shear walls, lateral forces may follow the path 2008 to 2010 to 2006/2004 to 2002, and down to wall 1002, thereby transmitting collected lateral force from the diaphragm down the shear wall to the steel transfer structure at ground level and into the foundation. These lateral forces may include forces from non-shear bearing walls that are transmitted into the diaphragm by the same connection detail (as described).

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A method to construct a multi-story building, the method comprising:

installing a stair and elevator module at a ground level of the building;

installing brace members, wherein the installed stair and elevator module is used as an erection aid that guides a positioning and an orientation of the brace members during installation of the brace members;

constructing a steel transfer structure that is linked to the brace members, wherein the steel transfer structure includes vertical columns and horizontal beams;

installing pre-manufactured first floor-ceiling panels by hanging the pre-manufactured first floor-ceiling panels from the beams;

positioning pre-manufactured first load bearing walls on top of the beams, wherein the first load bearing walls support vertical loads of the building;

installing pre-manufactured utility walls by hanging the utility walls from the first load bearing walls; and installing corridor panels by hanging the corridor panels from the utility walls.

2. The method of claim 1, wherein the utility walls span a single story in height.

3. The method of claim 1, wherein positioning the pre-manufactured first load bearing walls on top of the beams includes:

installing spigots at respective ends of a particular beam;

positioning a particular first load bearing wall over the particular beam such that openings of vertical tubular members, located at vertical edges of the particular first load bearing wall, receive the spigots installed at the respective ends of the particular beam; and affixing the spigots to the vertical tubular members, wherein the spigots provide alignment and structural support for the particular first load bearing wall.

4. The method of claim 1, wherein the building is a low-rise building having five or less stories.

5. The method of claim 1, wherein the building is a mid-rise building having at least six stories.

6. The method of claim 1, further comprising:

installing pre-manufactured second floor-ceiling panels by hanging the pre-manufactured second floor-ceiling panels from tops of the first load bearing walls; and positioning pre-manufactured second load bearing walls on top of the first load bearing walls.

7. The method of claim 6, wherein installing the pre-manufactured second floor-ceiling panels by hanging pre-manufactured second floor-ceiling panels from tops of the first load bearing walls includes:

positioning a horizontal section of an angle of a particular pre-manufactured second floor-ceiling panel over a top plate on top of a particular first load bearing wall, wherein the angle includes a vertical section that is attached to a top portion of the particular pre-manufactured second floor-ceiling panel, and wherein the particular pre-manufactured second floor-ceiling panel further includes a shear angle having a vertical section attached to the vertical section of the angle and a horizontal section attached to a top surface of the particular pre-manufactured second floor-ceiling panel; and placing a bottom plate of an adjacent load bearing wall on top of the horizontal section of the shear angle.

8. The method of claim 1, wherein the first load bearing walls include demising walls and shear walls.

9. A method to construct a multi-story building, the method comprising:

installing a stair and elevator module at a ground level of the building;

installing brace members, wherein the installed stair and elevator module is used as an erection aid that guides a positioning and an orientation of the brace members during installation of the brace members;

constructing a steel transfer structure that is linked to the brace members, wherein the steel transfer structure includes vertical columns and horizontal beams;

installing pre-manufactured first floor-ceiling panels by hanging the pre-manufactured first floor-ceiling panels from the beams;

positioning pre-manufactured first load bearing walls on top of the beams;

installing pre-manufactured utility walls by hanging the utility walls from the first load bearing walls; and installing corridor panels by hanging the corridor panels from the utility walls, wherein the corridor panels each include an angle attached to a top edge of the corridor panels, wherein the angle includes a horizontal section, and wherein installing the corridor panels includes laying the horizontal section of the angle on top of a horizontal member located at a lower portion of the utility walls.

10. The method of claim 9, further comprising connecting together multiple horizontal members located at lower portions of the utility walls so as to provide linkage for transfer of lateral load.

11. The method of claim 1, wherein installing the pre-manufactured utility walls that are hung from the first load bearing walls includes positioning tabs of the utility walls into corresponding slots of the first load bearing walls.

12. The method of claim 1, wherein load is transferred from the first load bearing walls to a horizontal diaphragm formed by the pre-manufactured first floor-ceiling panels, and then from the diaphragm to the brace members or steel transfer structure.

13. The method of claim 1, wherein:

constructing the steel transfer structure includes constructing a frame that includes vertical columns, horizontal girders that join two consecutive columns, and horizontal beams attached perpendicularly to a pair of the girders, and the steel transfer structure includes columns that are positioned at every other beam such that consecutive beams do not both have a column positioned at ends of the consecutive beams.

14. The method of claim 1, wherein:

the building includes respective brace members connected to stair and elevator modules at all stories of the building, and a structural frame, other than the brace members connected to the stair and elevator modules at all stories of the building, is absent above a first story of the building.

15. A multi-story building, comprising:

a stair and elevator module at a ground level of the building;

brace members that are positioned and oriented relative to the stair and elevator module;

a steel transfer structure that is linked to the brace members, wherein the steel transfer structure includes vertical columns and horizontal beams;

pre-manufactured first floor-ceiling panels that are hung from the beams;

pre-manufactured first load bearing walls positioned on top of the beams, wherein the first load bearing walls support vertical loads of the building;

pre-manufactured utility walls that are hung from the first load bearing walls; and corridor panels that are hung from the utility walls.

16. The building of claim 15, wherein the utility walls span a single story in height, and wherein the corridor panels each include an angle attached to a top edge of the corridor panels, wherein the angle includes a horizontal section, and wherein the corridor panels are installed such that the horizontal section of the angle is laid on top of a horizontal member located at a lower portion of the utility walls.

17. The building of claim 15, further comprising spigots installed at respective ends of a particular beam, wherein:

a particular first load bearing wall is positioned over the particular beam such that openings of vertical tubular members, located at vertical edges of the particular first load bearing wall, receive the spigots installed at the respective ends of the particular beam; and the spigots are affixed to the vertical tubular members, wherein the spigots provide alignment and structural support for the particular first load bearing wall.

18. The building of claim 15, wherein the building is a low-rise building having five or less stories.

19. The building of claim 15, further comprising:

pre-manufactured second floor-ceiling panels that are hung from tops of the first load bearing walls, wherein:

a horizontal section of an angle of a particular pre-manufactured second floor-ceiling panel is positioned over a top plate on top of a particular first load bearing wall, wherein the angle includes a vertical section that is attached to a top portion of the particular pre-manufactured second floor-ceiling panel, and wherein the particular pre-manufactured second floor-ceiling panel includes a shear angle having a vertical section attached to the vertical section of the angle and a horizontal section attached to a top surface of the particular pre-manufactured second floor-ceiling panel; and a bottom plate of an adjacent load bearing wall is placed on top of the horizontal section of the shear angle; and pre-manufactured second load bearing walls that are positioned on top of the first load bearing walls.

20. The building of claim 15, wherein load is transferred from the first load bearing walls to a diaphragm formed by the pre-manufactured first floor-ceiling panels, and then from the diaphragm to the brace members or steel transfer structure.

* * * * *